(12) United States Patent
Ochi et al.

(10) Patent No.: US 10,385,798 B2
(45) Date of Patent: Aug. 20, 2019

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Yuta Ochi, Susono (JP); Toshimi Kashiwagura, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 22 days.

(21) Appl. No.: 15/317,651

(22) PCT Filed: Jun. 8, 2015

(86) PCT No.: PCT/JP2015/002871
§ 371 (c)(1),
(2) Date: Dec. 9, 2016

(87) PCT Pub. No.: WO2015/190084
PCT Pub. Date: Dec. 17, 2015

(65) Prior Publication Data
US 2017/0107932 A1 Apr. 20, 2017

(30) Foreign Application Priority Data
Jun. 11, 2014 (JP) .................................. 2014-120797

(51) Int. Cl.
*F02D 41/40* (2006.01)
*F02D 41/30* (2006.01)
(Continued)

(52) U.S. Cl.
CPC .......... *F02D 41/402* (2013.01); *F02D 41/26* (2013.01); *F02D 41/3005* (2013.01);
(Continued)

(58) Field of Classification Search
None
See application file for complete search history.

(56) References Cited

U.S. PATENT DOCUMENTS 4,621,599 A * 11/1986 Igashira .................... F02B 3/00
123/300
5,078,107 A 1/1992 Morikawa
(Continued)

FOREIGN PATENT DOCUMENTS

CN 101501318 A 8/2009
DE 19815266 A1 10/1998
(Continued)

OTHER PUBLICATIONS

Non-Final Office Action of U.S. Appl. No. 15/482,041 dated Jul. 17, 2018, 17 pages.
(Continued)

*Primary Examiner* — Sizo B Vilakazi
*Assistant Examiner* — Kevin R Steckbauer
(74) *Attorney, Agent, or Firm* — Hunton Andrews Kurth LLP

(57) ABSTRACT

An object of the present invention is to cause diesel combustion to occur with reduced smoke in an internal combustion engine using a fuel having a relatively high self-ignition temperature. A control apparatus performs first injection at a first injection time during the compression stroke, causes spray guide combustion to occur, and starts to perform second injection at such a second injection time after the occurrence of the spray guide combustion and before the top dead center of the compression stroke that causes combustion of injected fuel to be started by flame generated by the spray guide combustion, thereby causing self-ignition and diffusion combustion of fuel to occur. In an operation range in which the engine load is higher than a predetermined load, the apparatus performs third injection at
(Continued)

such a third injection time before the first injection time during the compression stroke that causes the fuel injected by said third injection to be burned by self-ignition or diffusion combustion after the start of the second injection.

5 Claims, 16 Drawing Sheets

(51) Int. Cl.
*F02D 41/26* (2006.01)
*F02P 13/00* (2006.01)

(52) U.S. Cl.
CPC ....... *F02D 41/3017* (2013.01); *F02D 41/401* (2013.01); *F02D 41/403* (2013.01); *F02P 13/00* (2013.01); *F02D 41/3023* (2013.01); *F02D 41/405* (2013.01); *F02D 2250/38* (2013.01); *Y02T 10/44* (2013.01)

(56) References Cited

U.S. PATENT DOCUMENTS

| | | | | |
|---|---|---|---|---|
| 6,386,177 | B2* | 5/2002 | Urushihara | F02B 17/005 |
| | | | | 123/299 |
| 6,659,073 | B1 | 12/2003 | Franke et al. | |
| 6,968,825 | B2 | 11/2005 | Hitomi et al. | |
| 7,171,953 | B2 | 2/2007 | Altenschmidt | |
| 7,204,228 | B2 | 4/2007 | Oechsle et al. | |
| 7,314,036 | B2 | 1/2008 | Altenschmidt | |
| 7,441,537 | B2* | 10/2008 | Szekely, Jr. | F02D 41/3023 |
| | | | | 123/299 |
| 7,894,976 | B2* | 2/2011 | Yun | F02B 1/12 |
| | | | | 123/435 |
| 8,312,860 | B2* | 11/2012 | Yun | F02B 1/12 |
| | | | | 123/295 |
| 8,670,918 | B2* | 3/2014 | Morinaga | F02D 41/0057 |
| | | | | 701/103 |
| 9,051,895 | B2* | 6/2015 | Miyaura | F02D 41/40 |
| 9,382,857 | B2* | 7/2016 | Glugla | F02D 41/025 |
| 9,599,061 | B2* | 3/2017 | Idicheria | F02D 41/402 |
| 9,745,914 | B2* | 8/2017 | Ochi | F02D 41/3017 |
| 9,784,207 | B2* | 10/2017 | Ochi | F02D 41/3017 |
| 9,845,763 | B2* | 12/2017 | Solomon | F02D 41/405 |
| 9,863,372 | B2* | 1/2018 | Fujimoto | F02D 41/0057 |
| 10,012,174 | B2* | 7/2018 | Shirahashi | F02B 3/12 |
| 10,024,250 | B2* | 7/2018 | Shirahashi | F02D 35/027 |
| 10,161,339 | B2* | 12/2018 | Kusakabe | F02D 41/20 |
| 2001/0015192 | A1* | 8/2001 | Urushihara | F02B 17/005 |
| | | | | 123/299 |
| 2006/0124104 | A1* | 6/2006 | Altenschmidt | F02D 41/3029 |
| | | | | 123/299 |
| 2007/0175438 | A1* | 8/2007 | Szekely, Jr. | F02D 41/3023 |
| | | | | 123/299 |
| 2008/0228378 | A1 | 9/2008 | Kohler et al. | |
| 2009/0071440 | A1 | 3/2009 | Ashizawa | |
| 2009/0272362 | A1* | 11/2009 | Yun | F02B 1/12 |
| | | | | 123/295 |
| 2009/0272363 | A1* | 11/2009 | Yun | F02B 1/12 |
| | | | | 123/295 |
| 2011/0060514 | A1 | 3/2011 | Nada | |
| 2011/0320108 | A1* | 12/2011 | Morinaga | F02D 41/0057 |
| | | | | 701/105 |
| 2012/0323468 | A1* | 12/2012 | Miyaura | F02D 41/40 |
| | | | | 701/105 |
| 2013/0041571 | A1 | 2/2013 | Nogi | |
| 2013/0118163 | A1* | 5/2013 | Nishimura | F02D 41/0255 |
| | | | | 60/605.1 |
| 2015/0167576 | A1* | 6/2015 | Glugla | F02D 41/025 |
| | | | | 123/295 |
| 2016/0053700 | A1 | 2/2016 | Thomas | |
| 2016/0115895 | A1* | 4/2016 | Ochi | F02D 41/3017 |
| | | | | 123/305 |
| 2016/0290273 | A1* | 10/2016 | Ochi | F02D 41/403 |
| 2016/0326978 | A1* | 11/2016 | Solomon | F02D 41/405 |
| 2016/0333817 | A1* | 11/2016 | Ochi | F02D 41/3017 |
| 2016/0333818 | A1* | 11/2016 | Ochi | F02D 41/3017 |
| 2016/0341135 | A1* | 11/2016 | Shirahashi | F02D 35/027 |
| 2017/0022892 | A1* | 1/2017 | Fujimoto | F02B 47/02 |
| 2017/0022923 | A1* | 1/2017 | Fujimoto | F02D 41/3076 |
| 2017/0022924 | A1* | 1/2017 | Fujimoto | F02D 41/0057 |
| 2017/0184047 | A1* | 6/2017 | Shirahashi | F02D 41/402 |
| 2017/0184048 | A1* | 6/2017 | Shirahashi | F02B 3/12 |
| 2017/0184049 | A1* | 6/2017 | Shirahashi | F02B 3/12 |
| 2017/0248086 | A1* | 8/2017 | Hashimoto | F02D 41/401 |
| 2017/0284282 | A1* | 10/2017 | Ochi | F02D 41/0057 |
| 2017/0284329 | A1* | 10/2017 | Ashizawa | F02D 41/3047 |
| 2017/0292463 | A1 | 10/2017 | Ochi | |
| 2018/0195457 | A1* | 7/2018 | Negami | F02D 41/3035 |
| 2018/0283306 | A1* | 10/2018 | Kusakabe | F02D 41/20 |
| 2018/0313299 | A1* | 11/2018 | Kimura | F02D 19/0644 |
| 2018/0334971 | A1* | 11/2018 | Oh | F02D 19/084 |
| 2019/0063303 | A1* | 2/2019 | Matsumoto | F02M 61/1806 |
| 2019/0063337 | A1* | 2/2019 | Inoue | F02B 1/12 |
| 2019/0063338 | A1* | 2/2019 | Matsumoto | F02M 61/1806 |
| 2019/0063344 | A1* | 2/2019 | Matsumoto | F02B 23/0624 |
| 2019/0063360 | A1* | 2/2019 | Inoue | F02B 11/02 |

FOREIGN PATENT DOCUMENTS

| | | | | |
|---|---|---|---|---|
| DE | 102015210745 A1 | 12/2015 | | |
| EP | 1445461 A2 | 8/2004 | | |
| EP | 1867857 A1 | 12/2007 | | |
| JP | 2002-276442 A | 9/2002 | | |
| JP | 2003-254105 A | 9/2003 | | |
| JP | 2006-307659 A | 11/2006 | | |
| JP | 2007-064187 A | 3/2007 | | |
| JP | 2008169714 A | 7/2008 | | |
| JP | 2009-264332 A | 11/2009 | | |
| JP | 2009264332 A * | 11/2009 | | F02D 21/08 |
| JP | 2009275654 A | 11/2009 | | |
| JP | 2011153562 A | 8/2011 | | |
| JP | 2013136992 A | 7/2013 | | |
| JP | 2015137585 A | 7/2015 | | |
| JP | 2015137586 A | 7/2015 | | |
| JP | 2016000969 A | 1/2016 | | |
| WO | 2010041308 A1 | 4/2010 | | |
| WO | 2011061851 A1 | 5/2011 | | |
| WO | 2016042718 A1 | 3/2016 | | |

OTHER PUBLICATIONS

United States Patent and Trademark Office, Final Office Action issued to U.S. Appl. No. 15/482,041 dated Jan. 11, 2019, 34 pages.
United States Patent and Trademark Office, Notice of Allowance issued to U.S. Appl. No. 15/482,041 dated Apr. 4, 2019, 8 pages.
United States Patent and Trademark Office, Notice of Allowance issued to U.S. Appl. No. 15/482,041 dated May 20, 2019, 5 pages.

* cited by examiner

[Fig. 1]
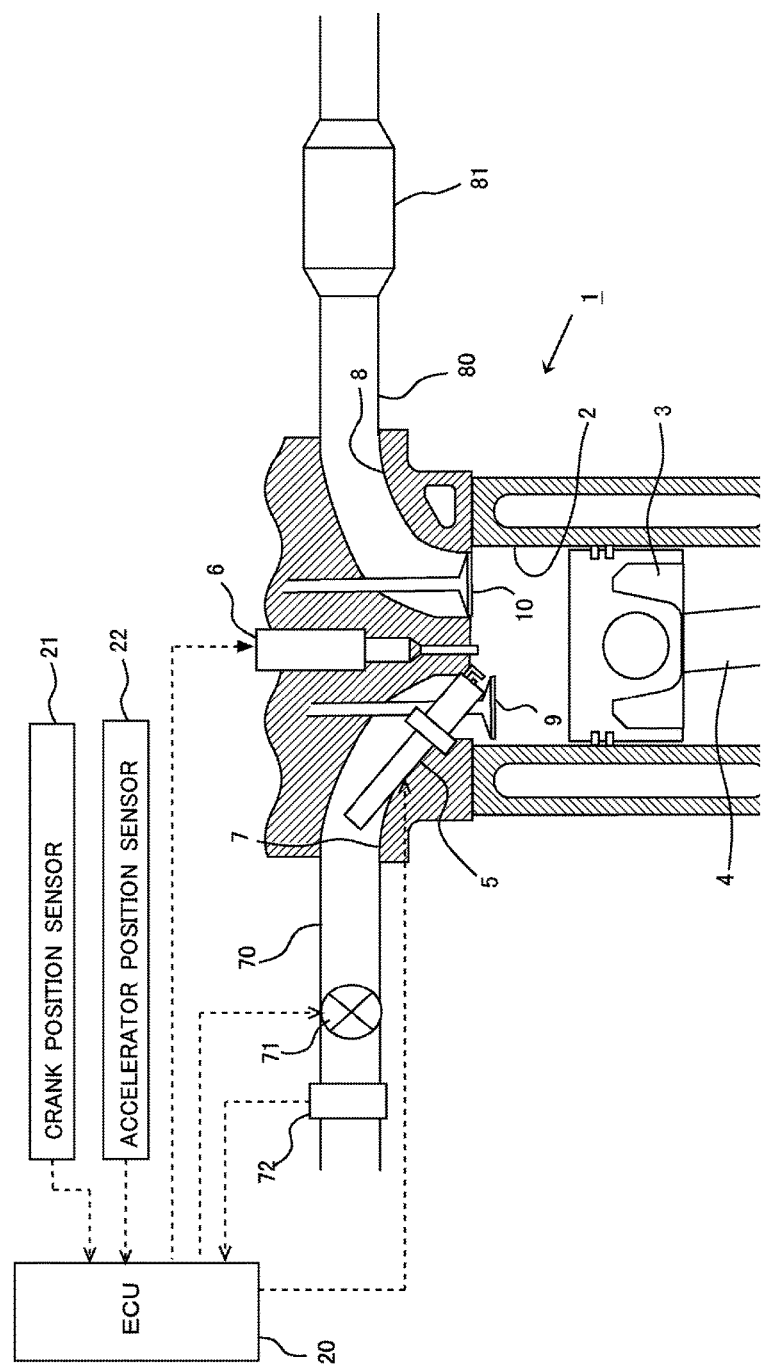

[Fig. 2]
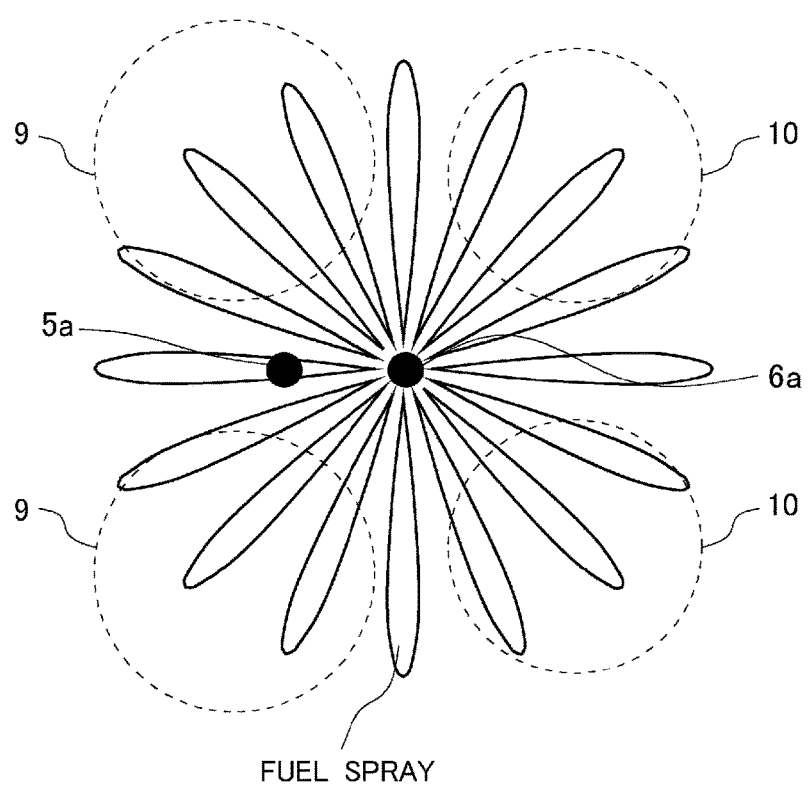
FUEL SPRAY

[Fig. 3]
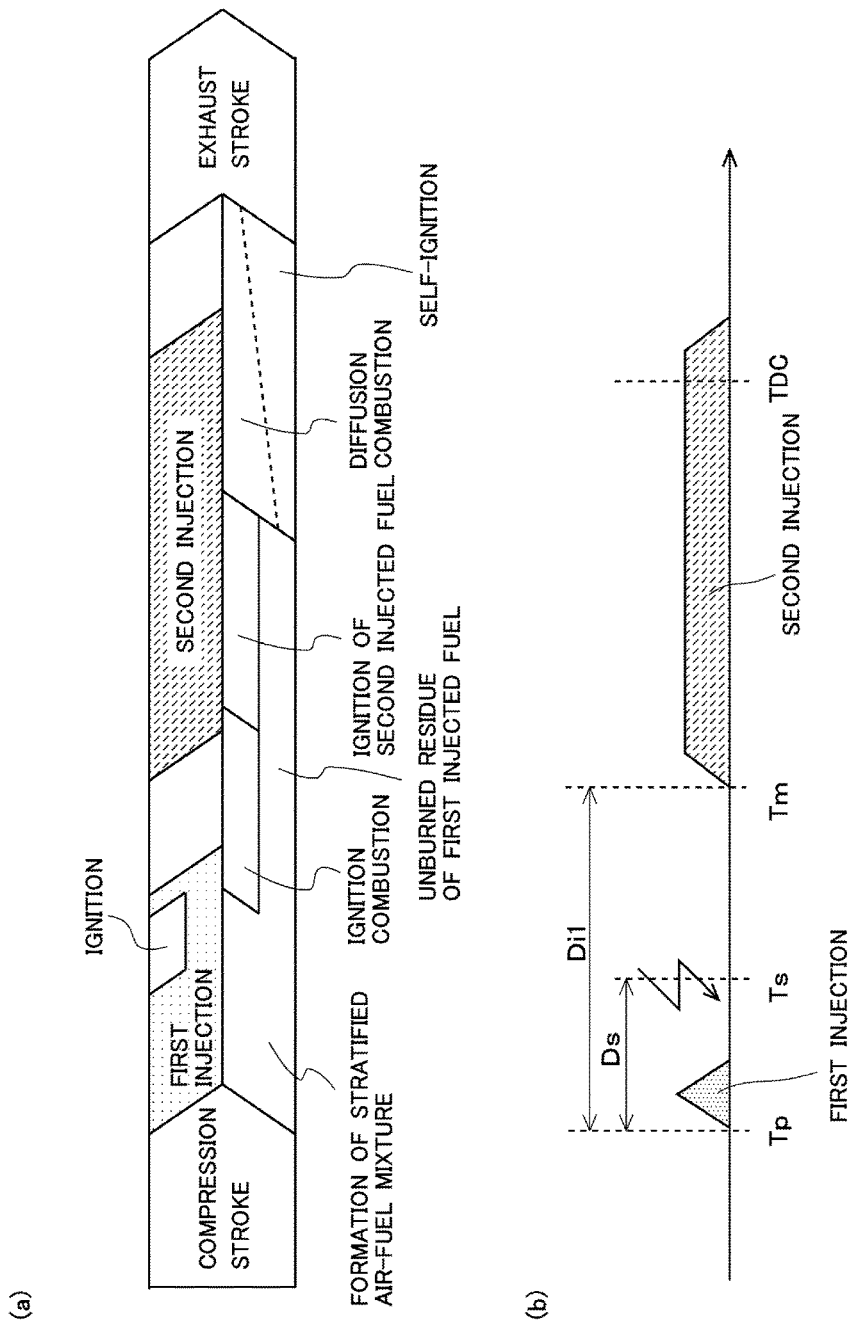

[Fig. 4]
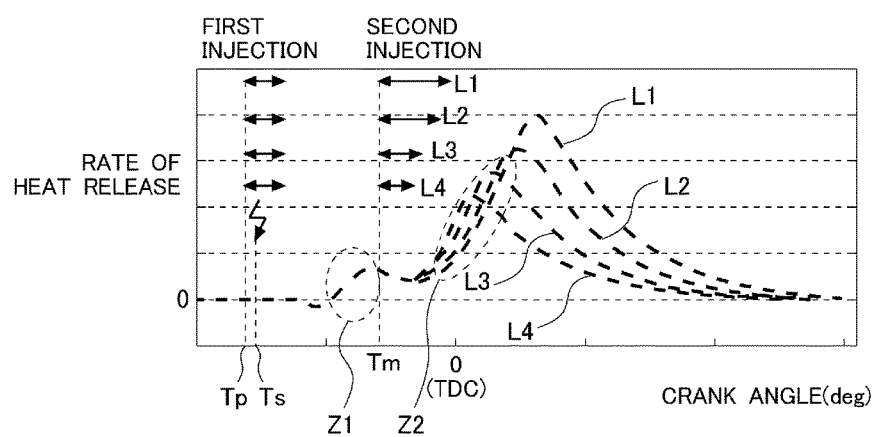
[Fig. 5]
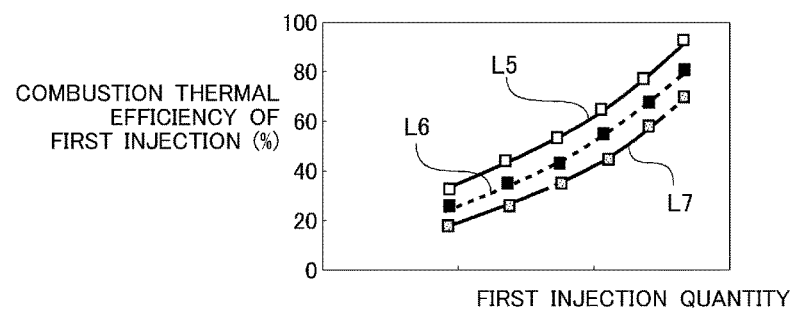

[Fig. 6]
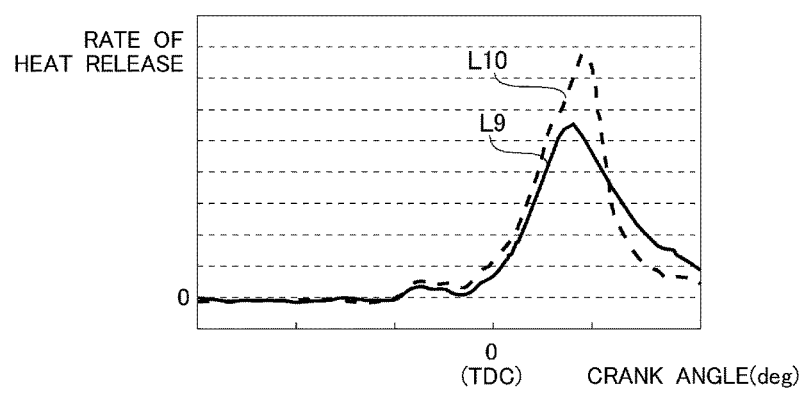
[Fig. 7]
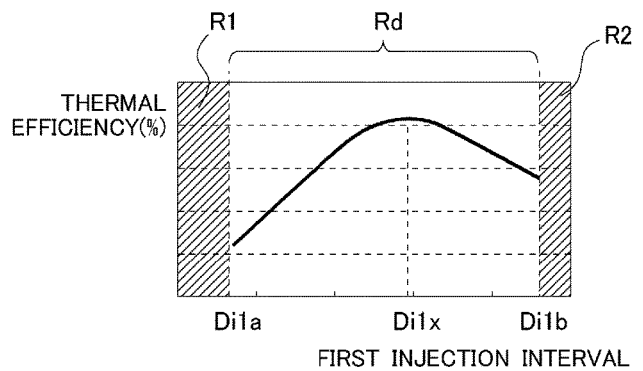

[Fig. 8]
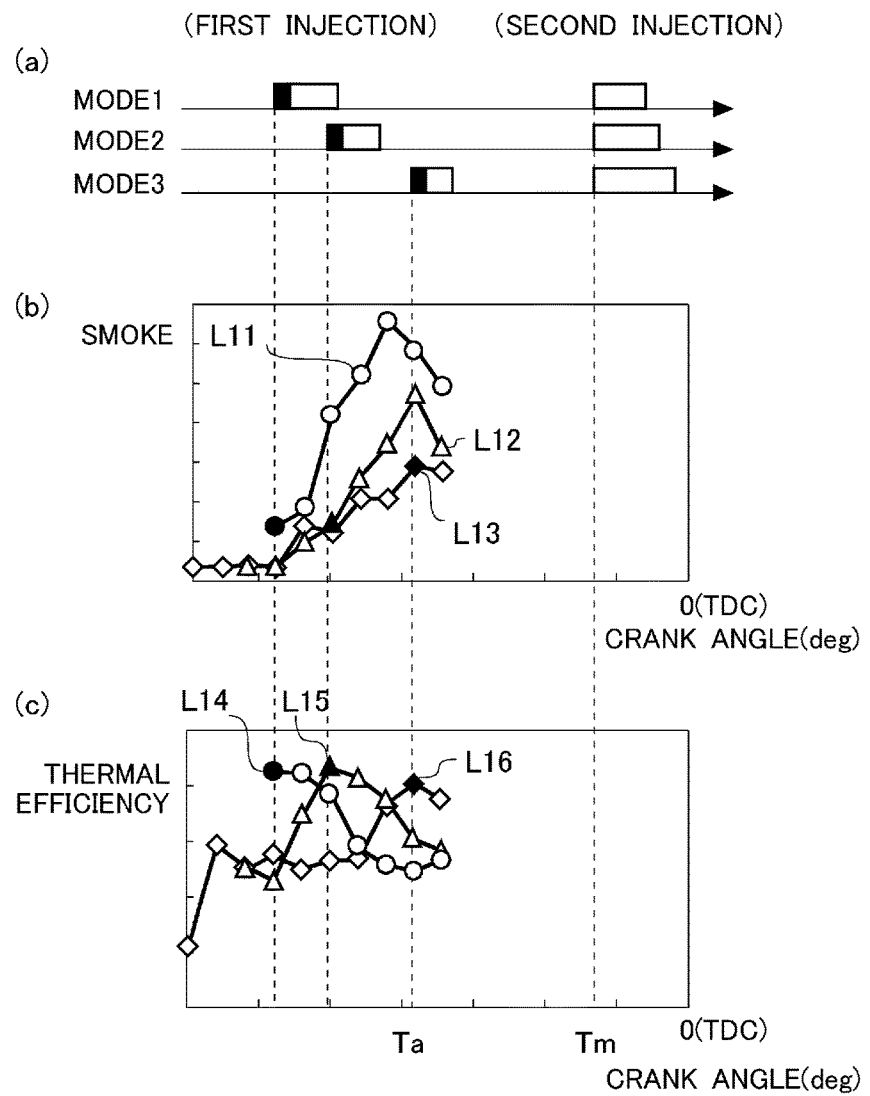

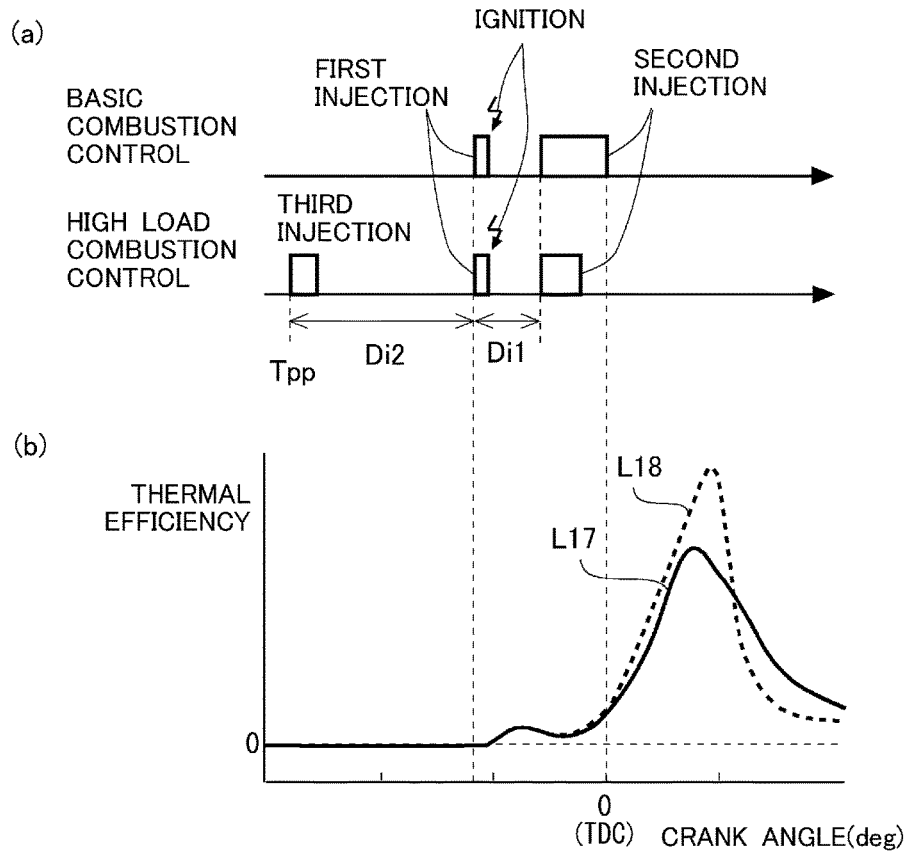

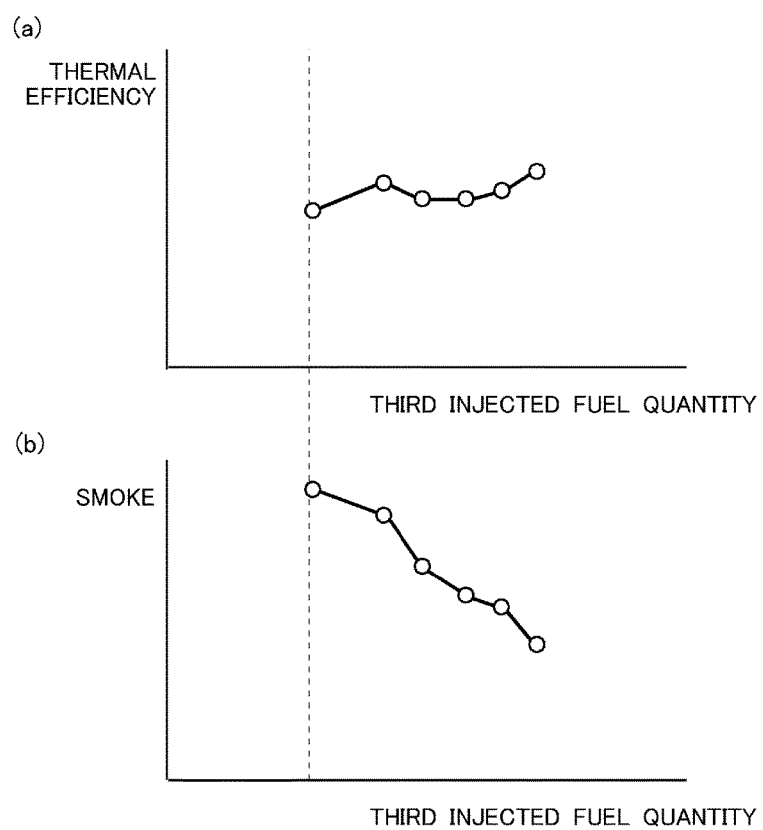

[Fig. 11]
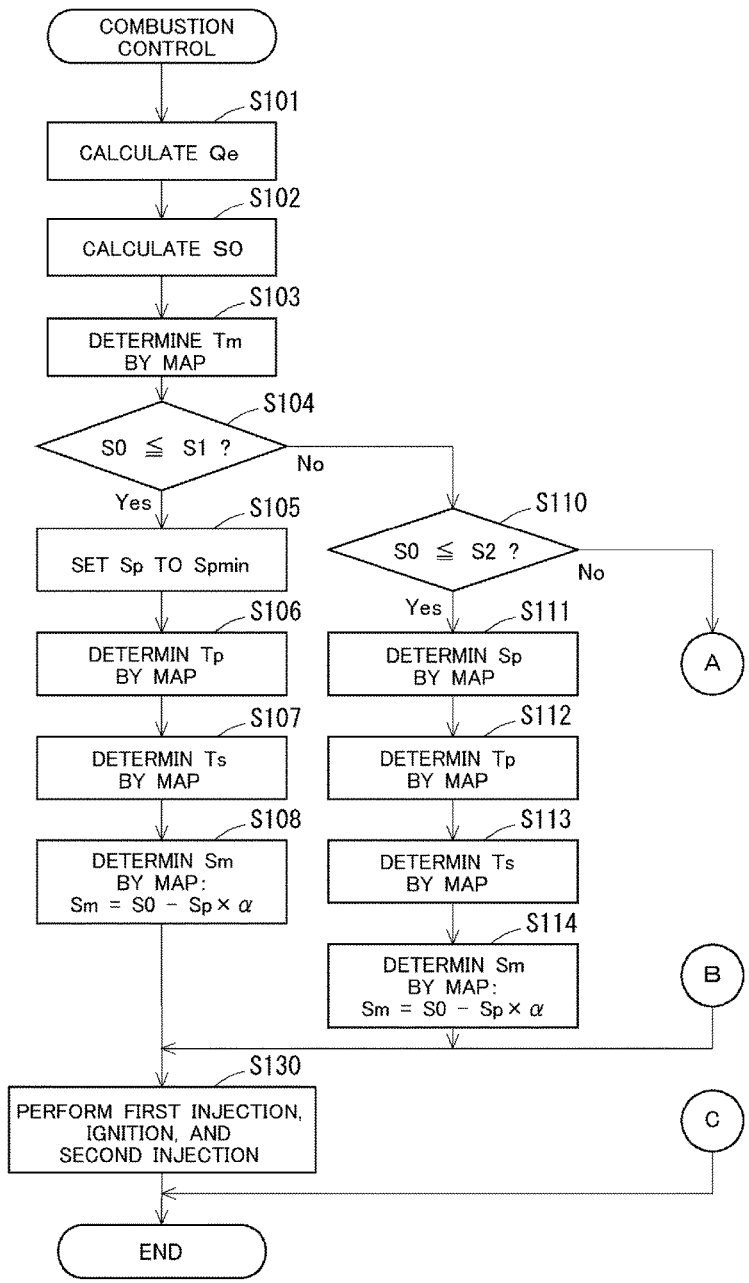

[Fig. 12]
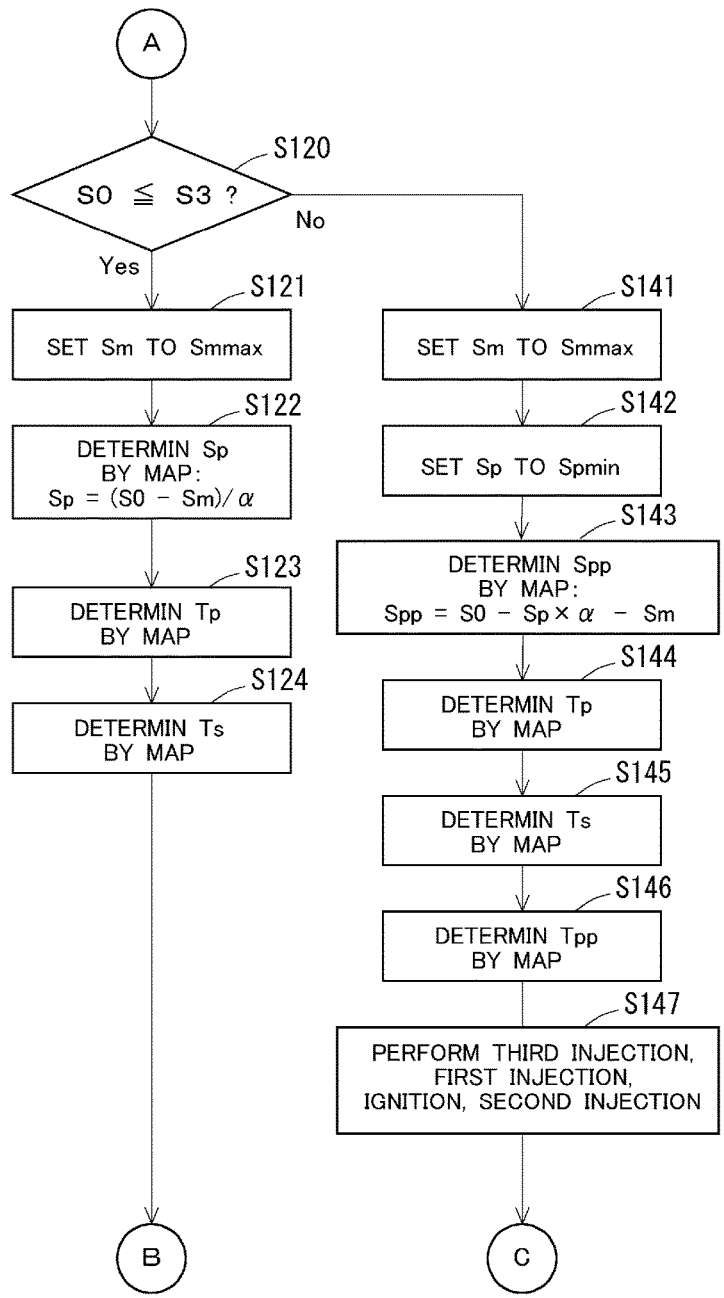

[Fig. 13]
(a)
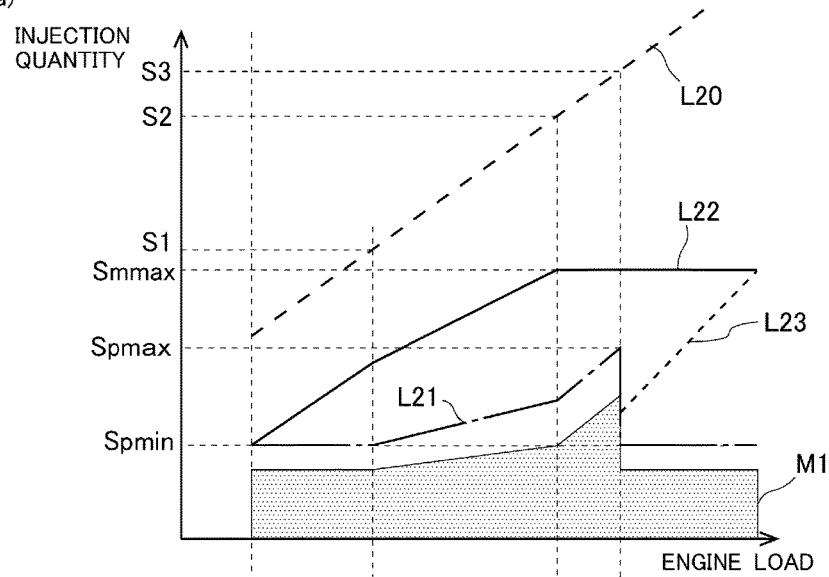
(b)
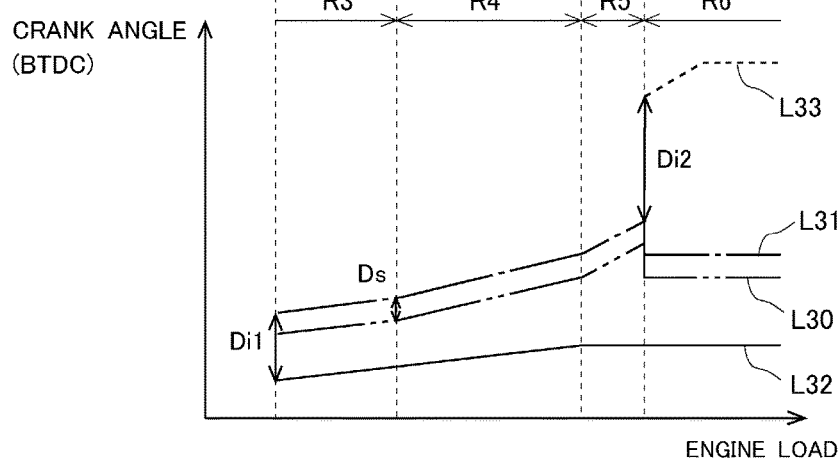

[Fig. 14]
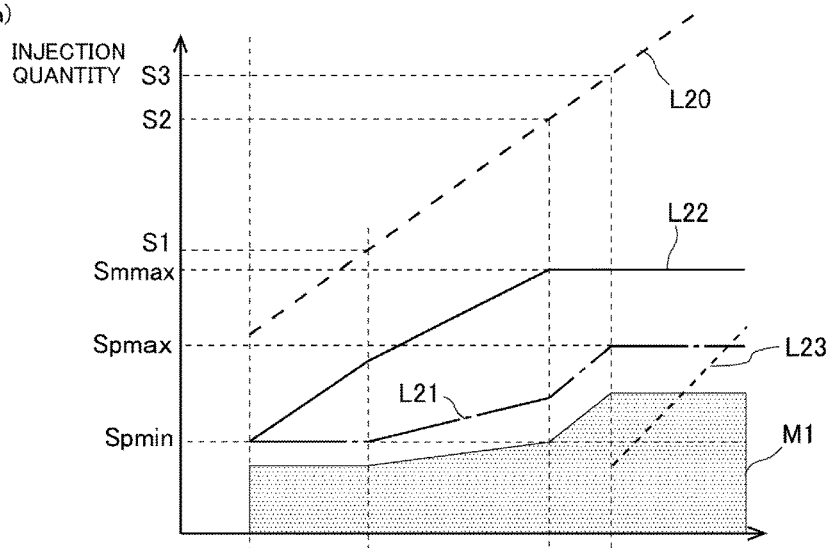
(a)
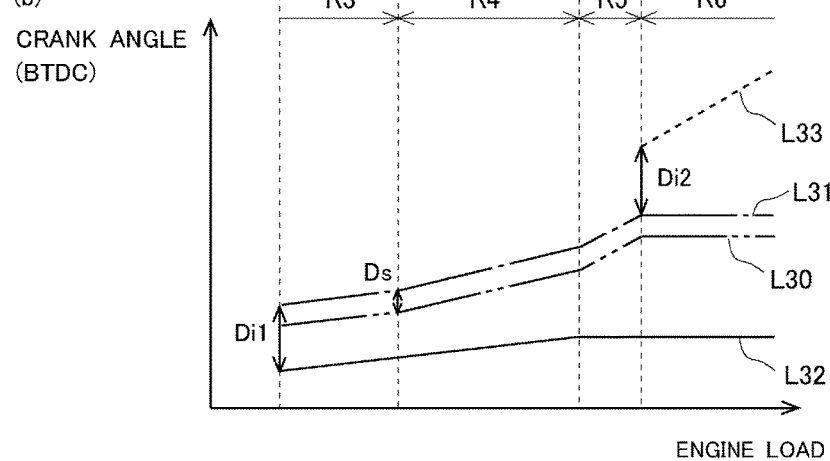
(b)

[Fig. 15]
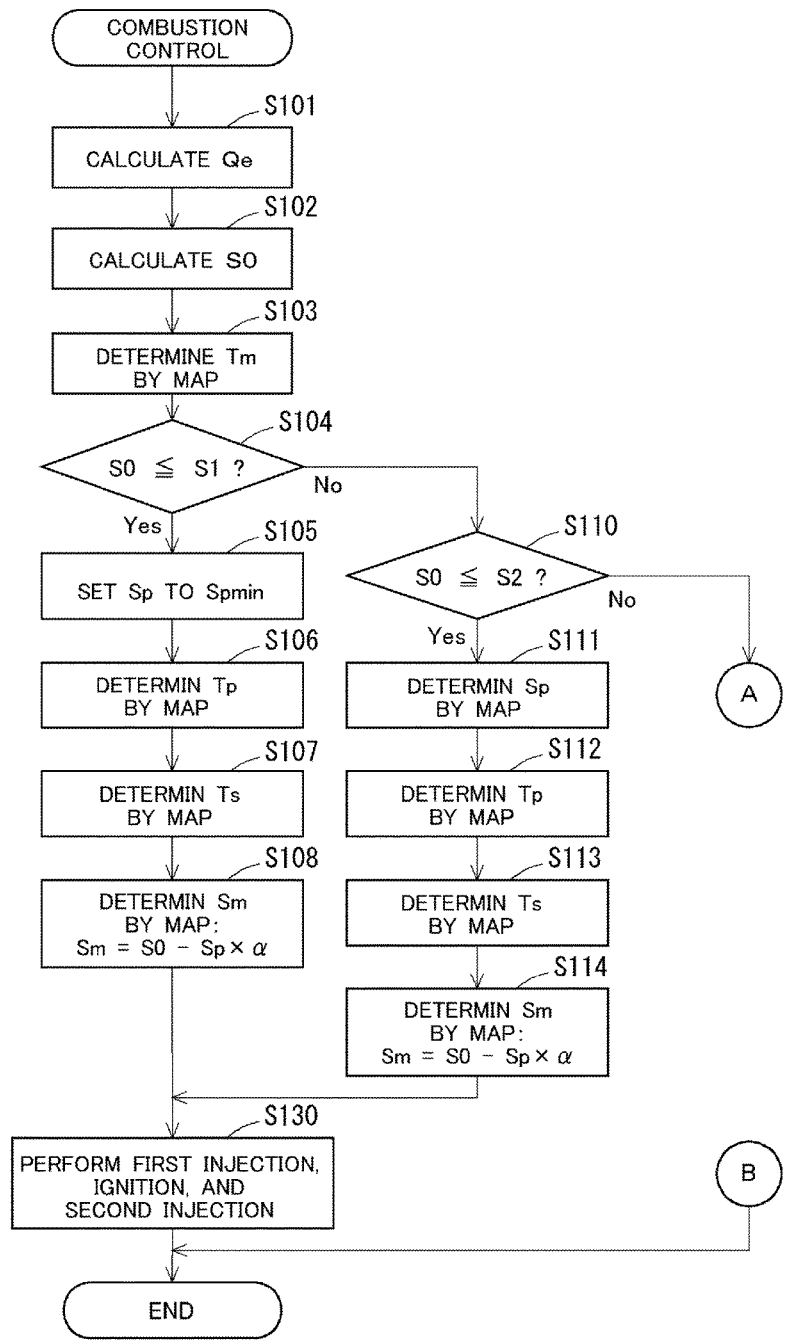

[Fig. 16]
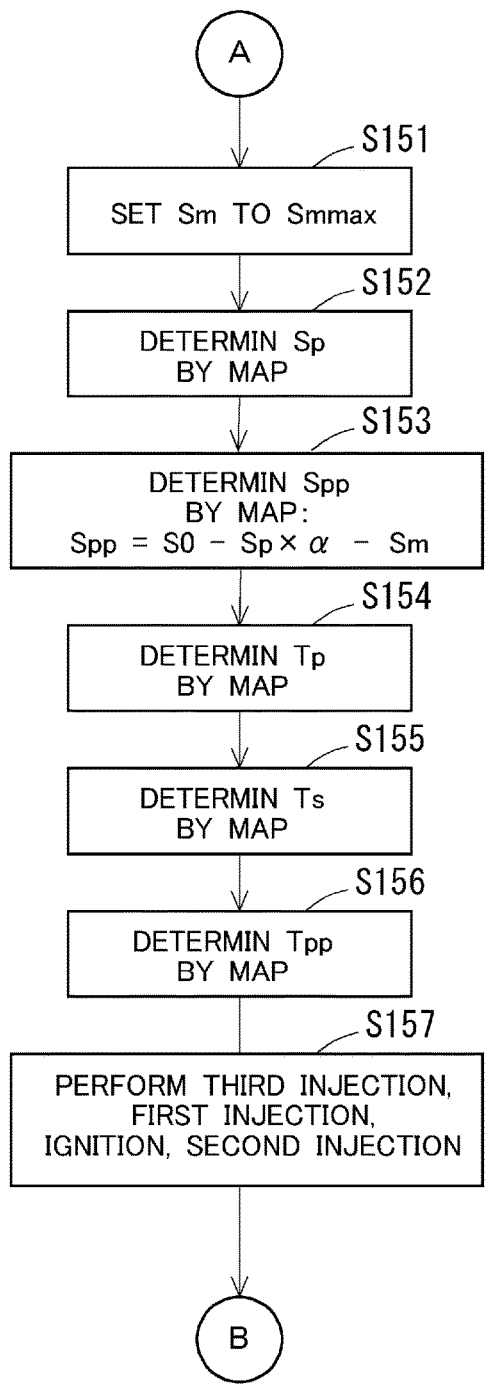

[Fig. 17]
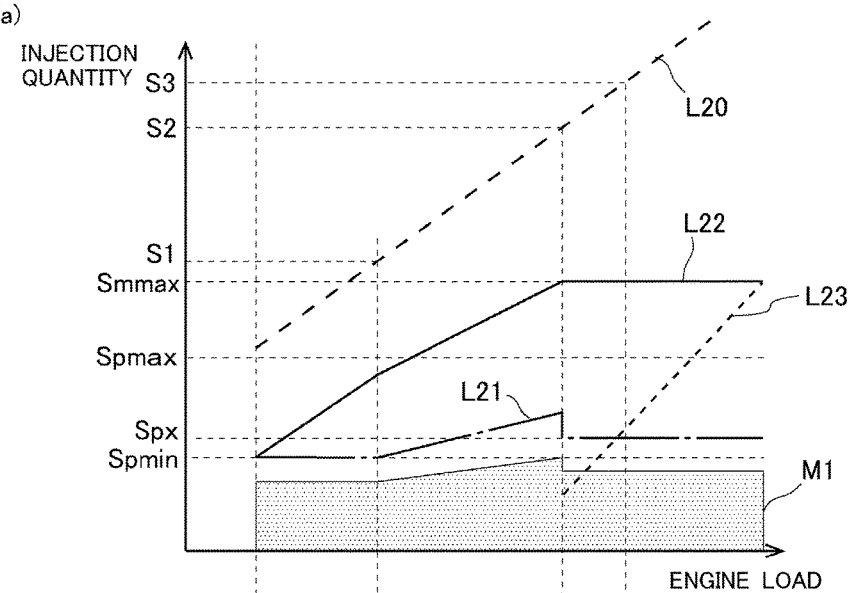
(a)
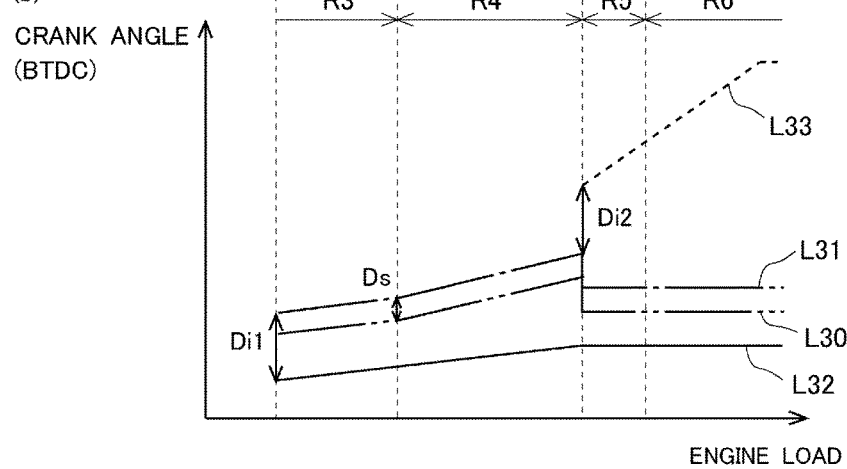
(b)

[Fig. 18]
(a)
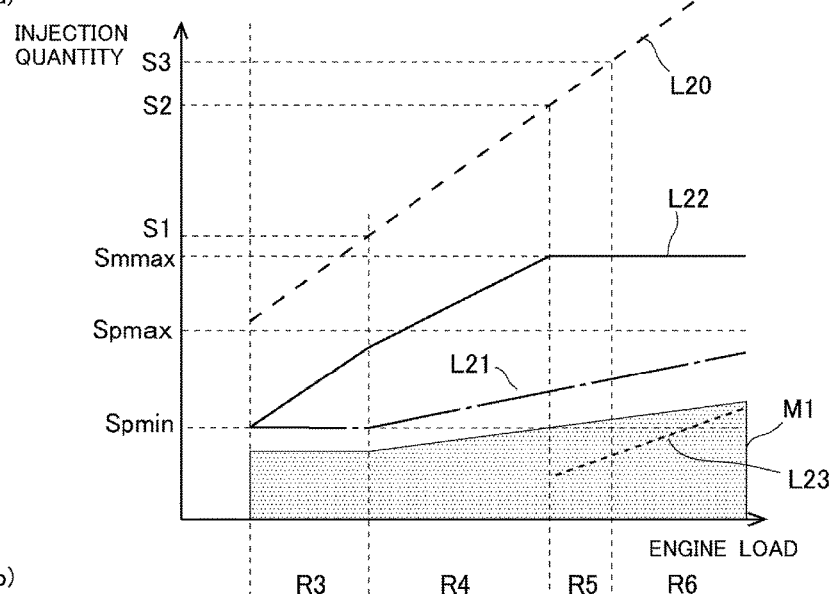
(b)
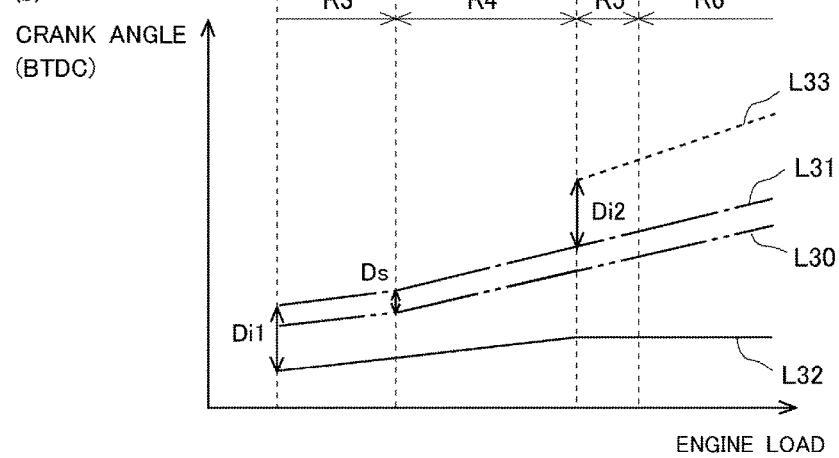

CONTROL APPARATUS FOR INTERNAL COMBUSTION ENGINE

CROSS-REFERENCE TO RELATED APPLICATIONS

This is a national phase application based on the PCT International Patent Application No. PCT/JP2015/002871 filed Jun. 8, 2015, claiming priority to Japanese Patent Application No. 2014-120797 filed Jun. 11, 2014, the entire contents of both of which are incorporated herein by reference.

TECHNICAL FIELD

The present invention relates to a control apparatus for an internal combustion engine.

BACKGROUND ART

What is called diesel combustion, in which fuel is directly injected into compressed air in the combustion chamber, self-ignites, and is burned by diffusion combustion, has a higher thermal efficiency as compared to combustion by spark ignition. In recent years, in order to enjoy this advantage of diesel combustion also in gasoline engines, technology for causing gasoline to self-ignite and burn by diffusion combustion has been developed.

For example, in the technology disclosed in PTL 1, first fuel injection is performed by an in-cylinder injection valve during the period in the first half of the compression stroke to produce substantially homogenous air-fuel mixture in the entirety of the combustion chamber. Then, the air-fuel mixture produced by the first fuel injection is spark-ignited. Thereafter, second fuel injection is performed to burn the injected fuel. With this combustion, the temperature and pressure in the combustion chamber rise to cause the remaining fuel to self-ignite.

PTL 2 discloses a technology that causes diffusion combustion to occur in a relatively high load operation range of the gasoline engine in which knocking is likely to occur. In the technology disclosed in PTL 2, in the operation range in which knocking is likely to occur, first fuel injection is performed in the cylinder at a time before the top dead center of the compression stroke to burn the injected fuel by spark ignition. Then, second fuel injection is performed in the cylinder at a time after the top dead center of the compression stroke, at which the pressure of in the combustion chamber has been raised by the combustion, to cause the injected fuel to burn by diffusion combustion. In this technology, either homogenous fuel injection that produces homogeneous air-fuel mixture in the entirety of the combustion chamber or stratified fuel injection that produces air-fuel mixture only in a part of the interior space of the combustion chamber is selectively performed as the first fuel injection, depending on the engine speed.

PTL 3 discloses a technology for causing diesel combustion using as fuel natural gas having a relatively high self-ignition temperature. In the technology disclosed in PTL 3, fuel injection is performed in a specific spark ignition region in the combustion chamber at a time in the early or middle stage of the compression stroke to produce air-fuel mixture that can be spark-ignited. The air fuel mixture produced in this spark ignition region is ignited at a time immediately before the top dead center of the compression stroke to cause spark-ignition combustion. Thus, a high-temperature, high-pressure condition enabling self-ignition of natural gas is established in the combustion chamber. Thereafter, fuel is injected directly into the combustion chamber in the high-temperature, high-pressure condition to cause the fuel to burn by diesel combustion.

CITATION LIST

Patent Literature

PTL 1: Japanese Patent Application Laid-Open No. 2002-276442
PTL 2: Japanese Patent Application Laid-Open No. 2007-064187
PTL 3: Japanese Patent Application Laid-Open No. 2003-254105

SUMMARY OF INVENTION

Technical Problem

In the case where fuel having a relatively high self-ignition temperature like gasoline is burned by diesel combustion, when the quantity of fuel injected into the combustion chamber is increased in response to an increase in the engine load, there is a possibility that a situation in which the quantity of oxygen is insufficient relative to fuel may arise locally to lead to an increase in the amount of smoke generated. The present invention has been made in view of this problem, and its object is to bring about diesel combustion with reduced amount of smoke in an internal combustion engine using a fuel having a relatively high self-ignition temperature.

Solution to Problem

In the apparatus according to the present invention, first injection is performed during the compression stroke by a fuel injection valve capable of injecting fuel into the combustion chamber of the internal combustion engine, and the fuel injected by the first injection (which will be sometimes referred to as the "first injected fuel") is ignited by spark ignition. Thereafter, second injection that mainly determines the power of the internal combustion engine is started at a time before the top dead center of the compression stroke. As a consequence, combustion of the fuel injected by the second injection (which will be sometimes referred to as the "second injected fuel") is started by flame generated by spark ignition of the first injected fuel, and self-ignition and diffusion combustion of fuel occur.

In the apparatus according to the present invention, in an operation range in which the engine load of the internal combustion engine is higher than a predetermined load, third injection is performed in addition to the first injection and the second injection. The third injection is performed at a time before the first injection during the compression stroke. The fuel injected by the third injection (which will be sometimes referred to as the "third injected fuel") is burned by self-ignition or diffusion combustion after the start of the second injection. In the context of the present invention, the terms "first injection", "second injection", and "third injection" are used only for the sake of convenience in making a distinction among fuel injections performed during one combustion cycle.

More specifically, a control apparatus for an internal combustion engine according to the present invention comprises:

a fuel injection valve capable of injecting fuel into a combustion chamber of an internal combustion engine;

an ignition device whose position relative to the fuel injection valve is set in such a way that fuel spray injected through said fuel injection valve passes through an ignition-capable region and the ignition device can ignite the fuel spray directly; and combustion control means that performs first injection through said fuel injection valve at a first injection time during the compression stroke, ignites pre-spray formed by the first injection by said ignition device, and starts to perform second injection through said fuel injection valve at a second injection time after the ignition of said pre-spray by said ignition device and before the top dead center of the compression stroke with a predetermined first injection interval between said first injection time and said second injection time, said first injection interval being set in such a way that combustion of the fuel injected by said second injection is started by flame generated by ignition of said pre-spray, thereby causing self-ignition of fuel to occur and causing a portion of fuel injected by said second injection to be burned by diffusion combustion, wherein in an operation range in which the engine load of the internal combustion engine is higher than a predetermined load, said combustion control means performs third injection in addition to said first injection and second injection at a third injection time prior to said first injection time during the compression stroke with a second injection interval between said first injection and said third injection, said second injection interval being set in such a way that the fuel injected by said third injection is burned by self-ignition or diffusion combustion after the start of said second injection.

In the apparatus according to the present invention, the position of the ignition device relative to the fuel injection valve is set in such a way that the ignition device can directly ignite passing fuel spray, which is fuel spray injected through the fuel injection valve and passing through the ignition-capable region. In a known typical mode of igniting fuel spray, air-fuel mixture is brought to the ignition-capable region of the ignition device by means of gas flow formed in the combustion chamber when the intake valve is opened or utilizing the shape of a cavity or the like located on top of the piston, so that the fuel spray is ignited by the ignition device. In such a generally employed mode of ignition, in order to enable satisfactory ignition of fuel spray, the injection time at which injection through the injection valve is to be performed is limited by the opening time of the intake valve and the position of the piston in the cylinder and other factors. In contrast to this, in the control apparatus for an internal combustion engine according to the present invention, since the relative position of the fuel injection valve and the ignition device is set relative to each other as described above, control of the fuel injection time and the ignition time has very high flexibility, enabling control of fuel injections by the combustion control means, which will be described later. Preferably, the ignition device employed with the present invention is adapted to be capable of directly igniting the passing fuel spray injected through the fuel injection valve at desired time regardless of the opening time of the intake valve or the piston position of the internal combustion engine.

In the combustion control according to the present invention, the first injection is performed at the first injection time during the compression stroke, and the pre-spray formed by the first injected fuel is ignited by the ignition device. Then, after the second ignition is started at the second injection time before the top dead center of the compression stroke, self-ignition and diffusion combustion of fuel occur. Although the second injection is started at a time before the top dead center of the compression stroke, it may continue past the top dead center.

The interval between the first injection time and the second injection time is a predetermined first injection interval. The first injection interval is set in such a way that combustion of the second injected fuel is started by flame generated by ignition of the pre-spray. In other words, the first ignition time is not set as an arbitrary time during the compression stroke but determined in relation to the second injection time in such a way that ignition of the first injected fuel can generate flame serving as an ignition source for combustion of the second injected fuel. After combustion of the second fuel starts, the temperature and pressure in the combustion chamber rise, so that self-ignition of fuel occurs, and at least a portion of the second injected fuel is burned by diffusion combustion. The fuel burned in combustion started by ignition by the ignition device is only a part of the first injected fuel, and a large part of the first injected fuel is burned by self-ignition or diffusion combustion after the start of the second injection. In consequence, in the above-described combustion control, the first injected fuel and the second injected fuel both contribute to the power of the internal combustion engine. Therefore, diesel combustion having high thermal efficiency can be brought about.

In the apparatus according to the present invention, as the engine load of the internal combustion engine increases, it is necessary to increase the quantity of fuel injected into the combustion chamber. However, since the second injection is performed at a time near the top dead center of the compression stroke, at which the pressure in the combustion chamber is very high, the penetration of the fuel spray injected through the fuel injection valve is low. In other words, the fuel spray injected by the second injection is hard to spread extensively. Therefore, if the quantity of the second injected fuel is increased too much, the quantity of oxygen present around the spray of the second injected fuel or the quantity of oxygen available for combustion of the second injected fuel becomes insufficient relative to the quantity of fuel, possibly leading to an increase in the smoke generated.

As described above, a large part of the first injected fuel is not burned by ignition by the ignition device but remains unburned in the combustion chamber at the time when the second injection is performed. Therefore, as the first injected fuel quantity is increased instead of or together with the second injected fuel, the quantity of unburned residue of the first injected fuel remaining in the combustion chamber at the time when the second injection is performed also increases. However, if the quantity of the first injected fuel is increased too much, when the second injection is performed, the quantity of oxygen present around a region in the combustion chamber in which the unburned residue of the first injected fuel and the second injected fuel overlap (or coexist) or the quantity of oxygen available for combustion of the fuel existing in that region becomes insufficient relative to the quantity of fuel, possibly leading to an increase in the smoke generated.

Thus, if the quantity of injected fuel in the first and/or second injection is increased too much, there is a possibility that the amount of smoke generated may increase. In view of this, in the apparatus according to the present invention, in the operation range in which the engine load of the internal combustion engine is higher than a predetermined load, the combustion control means performs the third injection in addition to the first injection and the second injection. The predetermined load mentioned above is a threshold of the engine load above which the quantity of fuel needed to be injected into the combustion chamber in one combustion cycle is relatively large and an increase in the first injected fuel quantity or the second injected fuel quantity might lead to an increase in the amount of smoke generated. The third injection is performed at the third injection time prior to the first injection time during the compression stroke. The interval between the first injection time and the third injection time is a predetermined second injection interval. The second injection interval is determined in such a way that the third injected fuel is burned by self-ignition or diffusion combustion after the start of the second injection. In the time period before the first injection time during the compression stroke, the pressure in the combustion chamber is relatively low. Therefore, fuel injected into the combustion chamber tends to spread extensively. Although flame is generated by ignition of the pre-spray of the first injected fuel, fuel at locations in the combustion chamber away from the flame is hard to be burned in combustion started by the flame. Therefore, appropriately adjusting the interval between the first injection time and the third injection time enables a large part of the third injected fuel not to be burned by flame generated by ignition of the pre-spray after the first injection but to be burned by self-ignition or diffusion combustion after the start of the second injection. In other words, the third ignition time is not set as an arbitrary time before the first injection time during the compression stroke but determined in relation to the first injection time in such a way that at least a part of the third injected fuel can be burned by self-ignition or diffusion combustion after the start of the second injection. Thus, the third injected fuel is burned by self-ignition or diffusion combustion after the start of the second injection, so that not only the first injected fuel and the second injected fuel but also the third injected fuel contributes to the power of the internal combustion engine. Therefore, even when the third injection is performed in addition to the first injection and the second injection, diesel combustion can be brought about with high thermal efficiency.

At the time when the second injection is performed, the third injected fuel has spread more extensively in the combustion chamber than the unburned residue of the first injected fuel, because the third injection time is prior to the first injection time. Therefore, although the third injected fuel is present in the combustion chamber at the time when the second injection is performed, the third injected fuel is less likely to overlap with the second injected fuel than the unburned residue of the first injected fuel. Therefore, the third injected fuel is less likely to be a cause of smoke than the first injected fuel and the second injected fuel.

In the operation range in which the engine load is higher than the predetermined load, in the case where the third injection is performed, at least one of the first injected fuel quantity and the second injected fuel quantity can be made smaller than in the case where a quantity of fuel required by the engine load of the internal combustion engine is injected only by the first injection and the second injection without performing the third injection also in the operation range in which the engine load is higher than the predetermined range. Therefore, diesel combustion can be brought about with reduced smoke.

In the apparatus according to the present invention, in the operation range in which the engine load of the internal combustion engine is higher than the predetermined load, the combustion control means may increase the third injected fuel quantity and advance the third injection time in response to an increase in the engine load. By increasing the third injected fuel quantity in response to an increase in the engine load, the increase in the first injected fuel quantity and the increase in the second injected fuel quantity can be made smaller. Moreover, advancing the third injection time leads to an increase in the second injection interval, which is the interval between the third injection time and the first injection time. Therefore, even though the third injected fuel quantity is increased, the third injected fuel can be prevented from being burned by flame generated by ignition of pre-spray after the first injection. The more the third injection time is advanced, the lower the pressure in the combustion chamber at the time when the third injection is performed is, and consequently, the higher the penetration of the fuel spray injected through the fuel injection valve is. In other words, the fuel spray injected by the third injection tends to spread in the combustion chamber more extensively. Therefore, the third injected fuel is unlikely to be a cause of smoke. Therefore, diesel combustion can be brought about with reduced smoke, also in the operation range in which the engine load of the internal combustion engine is higher.

As described above, in the case where the quantity of injected fuel in the third injection is increased in response to an increase in the engine load in the operation range in which the engine load of the internal combustion engine is higher than the predetermined load, fifty percent or more of an increase in the total injected fuel quantity responsive to an increase in the engine load may be made up of an increase in the injected fuel quantity in the third injection, and the remaining portion of the increase in the total injected fuel quantity may be made up of an increase in the injected fuel quantity in at least one of the first injection and second injection. Even when the engine load of the internal combustion engine increases, the amount of smoke generated can be kept small by keeping the increase in the sum of the first injected fuel quantity and the second injected fuel quantity smaller than 50 percent of the increase in the total injected fuel quantity.

In the apparatus according to the present invention, in the operation range in which the engine load of the internal combustion engine is higher than the predetermined load and the third injection is performed, the combustion control means may keep the injected fuel quantity in the second injection at a fixed quantity regardless of the engine load. In this case, in the operation range in which the engine load of the internal combustion engine is higher than the predetermined load, the second injected fuel quantity is not increased even when the engine load is increased, but at least one of the first injected fuel quantity and the third injected fuel quantity is increased. Consequently, an increase in the amount of smoke generated due to an increase in the second injected fuel quantity can be prevented. In the combustion control according to the present invention, it is necessary that self-ignition of fuel occurs after the second injection, as described above. If the second injected fuel quantity is excessively large, the temperature in the combustion chamber is decreased by the evaporation latent heat of the second injected fuel, possibly leading to unstable combustion. By keeping the injected fuel quantity in the second injection at a fixed quantity regardless of the engine load in the operation range in which the engine load of the internal combustion engine is higher than the predetermined load, unstable combustion can be prevented from being caused due to evaporation latent heat of the second injected fuel.

In the apparatus according to the present invention, in the operation range in which the engine load is higher than the predetermined load and the third injection is performed, the combustion control means may keep the injected fuel quantity in the first injection at a fixed quantity regardless of the engine load. In this case, in the operation range in which the engine load of the internal combustion engine is higher than the predetermined load, the first injected fuel quantity is not increased even when the engine load is increased, but at least one of the second injected fuel quantity and the third injected fuel quantity is increased. Consequently, an increase in the amount of smoke generated due to an increase in the first injected fuel quantity can be prevented.

In the operation range in which the engine load of the internal combustion engine is equal to or lower than the predetermined load, the combustion control means may increase the first injected fuel quantity and advance the first injection time in response to an increase in the engine load. Advancing the first injection time helps extensive diffusion of fuel spray injected by the first injection. Therefore, by advancing the first injection time when the first injected fuel quantity is increased, the quantity of the unburned residue of the first injected fuel that remains in the combustion chamber at the time when the second injection is performed and is subject to self-ignition or diffusion combustion can be increased. Consequently, the thermal efficiency can be improved. However, the first injected fuel is more likely to be a cause of smoke than the third injected fuel. Therefore, in the operation range in which the engine load is higher than the predetermined load and the third injection is performed, the first injected fuel quantity may be kept at a fixed quantity regardless of the engine load, even in the case where the first injected fuel quantity is increased in response to an increase in the engine load in the operation range in which the engine load is equal to or lower than the predetermined load and the third injection is not performed. In this case, the first injected fuel quantity may be kept at a fixed quantity smaller than the largest value of the first injected fuel quantity in the operation range in which the engine load is equal to or lower than the predetermined load, and the first injection time may be kept at a fixed time later than the most advanced first injection time in the operation range in which the engine load is equal to or lower than the predetermined load. In this case, in the operation range in which the engine load is higher than the predetermined load, the amount of smoke derived from the first injected fuel can be made smaller than in the case where the first injected fuel quantity is kept at the largest value of the first injected fuel quantity in the operation range in which the engine load is equal to or lower than the predetermined load.

In the apparatus according to the present invention, in the case where the combustion control means is adapted to increase the injected fuel quantity in the third injection in response to an increase in the engine load in the operation range in which the engine load of the internal combustion engine is higher than the predetermined load, the predetermined load may be an engine load corresponding to the sum of an upper limit value of the injected fuel quantity in the first injection and an upper limit value of the injected fuel quantity in the second injection. The upper limit value of the injected fuel quantity in the first injection and the upper limit value of the injected quantity in the second injection are set for the respective fuel injections as quantities with which the amount of smoke derived from the first/second injected fuel reaches the upper limit of an allowable range. In the case where the predetermined load is set to the engine load corresponding to the sum of an upper limit value of the injected fuel quantity in the first injection and an upper limit value of the injected fuel quantity in the second injection, if diesel combustion is brought about only by the first injection and the second injection without performing the third injection also in the operation range in which the engine load of the internal combustion engine is higher than the predetermined load, the amount of smoke will exceed the upper limit of the allowable range. Therefore, in the operation range in which the engine load of the internal combustion engine is higher than the predetermined load as such, the injected fuel quantity in the third injection is increased in response to an increase in the engine load. Thus, the operation range in which diesel combustion can be brought about can be extended while keeping the amount of smoke within the allowable range.

Advantageous Effects of Invention

According to the present invention, diesel combustion can be brought about with reduced amount of smoke in an internal combustion engine using a fuel having a relatively high self-ignition temperature.

BRIEF DESCRIPTION OF DRAWINGS

FIG. 1 is a diagram showing the general configuration of the air-intake and exhaust systems of an internal combustion engine to which an example of the present invention is applied.

FIG. 2 is a diagram showing a mode of ignition by an ignition device with which the internal combustion engine shown in FIG. 1 is equipped.

FIG. 3 is a diagram illustrating basic combustion control performed in the example of the present invention.

FIG. 4 is a graph showing the change in the rate of heat release in the combustion chamber in a case where the basic combustion control according to the example of the present invention is performed.

FIG. 5 is a graph showing relationship between the first injected fuel quantity and the combustion efficiency of the first injected fuel in a case where the first injection is performed in the basic combustion control according to the example of the present invention.

FIG. 6 shows the change of the rate of heat release in the combustion chamber for different modes between which the ratio of the first injected fuel quantity and the second injected fuel quantity is different in the basic combustion control according to the example of the present invention.

FIG. 7 is a graph showing relationship between the first injection interval Di1 and the thermal efficiency of the internal combustion engine in the basic combustion control according to the example of the present invention.

FIG. 8 shows the change in the amount of smoke generated and the change in the thermal efficiency in a case where the second injection time Tm is fixed at a specific time before the top dead center of the compression stroke, and the first injection time Tp is varied, in the basic combustion control according to the example of the present invention.

FIG. 9 shows a variation in the change in the rate of heat release in the combustion chamber between the case where the basic combustion control is performed and in the case where the high load combustion control is performed in the example of the present invention.

FIG. 10 shows the change in the thermal efficiency of the internal combustion engine 1 and the change in the amount of smoke generated in relation to the change in the third injected fuel quantity Spp in the high load combustion control according to the example of the present invention.

FIG. 11 is a flow chart showing a part of a control flow of the combustion control according to example 1 of the present invention.

FIG. 12 is a flow chart showing another part of the control flow of the combustion control according to example 1 of the present invention.

FIG. 13 shows control maps used in the combustion control according to example 1 of the present invention.

FIG. 14 shows modified control maps used in the combustion control according to example 1 of the present invention.

FIG. 15 is a flow chart showing a part of a control flow of the combustion control according to example 2 of the present invention.

FIG. 16 is a flow chart showing another part of the control flow of the combustion control according to example 2 of the present invention.

FIG. 17 shows control maps used in the combustion control according to example 2 of the present invention.

FIG. 18 shows modified control maps used in the combustion control according to example 2 of the present invention.

DESCRIPTION OF EMBODIMENTS

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

EXAMPLE 1

FIG. 1 is a diagram showing the general configuration of the air-intake and exhaust systems of an internal combustion engine to which the present invention is applied. The internal combustion engine 1 shown in FIG. 1 is a four-stroke-cycle, spark-ignition internal combustion engine (gasoline engine) having a plurality of cylinders. FIG. 1 shows only one of the plurality of cylinders.

In each cylinder 2 of the internal combustion engine 1, a piston 3 is provided in a slidable manner. The piston 3 is linked with an output shaft (crankshaft), which is not shown in the drawings, by a connecting rod 4. The interior of the cylinder 2 is in communication with intake ports 7 and exhaust ports 8. An end of the intake port 7 opening into the cylinder 2 is opened/closed by an intake valve 9. An end of the exhaust port 8 opening into the cylinder 2 is opened/closed by an exhaust valve 10. The intake valve 9 and the exhaust valve 10 are driven to be opened/closed respectively by an intake cam and an exhaust cam not shown in the drawings.

Furthermore, each cylinder 2 is provided with a fuel injection valve 6 for injecting fuel into the cylinder. The fuel injection valve 6 is arranged at the center on top of the combustion chamber formed in the cylinder 2. Moreover, an ignition plug 5 that can ignite fuel injected through the fuel injection valve 6 is provided in the cylinder head of the internal combustion engine 1. Specifically, the fuel injection valve 6 has an injection port 6a with which fuel can be injected nearly radially in 16 (sixteen) directions as shown in FIG. 2. The position of the ignition plug 5 relative to the fuel injection valve 6 is arranged in such a way that at least one of the fuel sprays injected from the injection port 6a passes through a region 5a in which the ignition plug 5 is capable of igniting and that the fuel spray thus passing through this region 5a can be directly ignited by a spark generated between the electrodes in the region 5a. The ignition plug 5 is located between the two intake valves 9 so that it does not interfere with the operations of the intake valves 9 and the exhaust valves 10. The location of the ignition device in the apparatus according to the present invention is not limited to a position between the two intake valves.

The ignition plug 5 and the fuel injection valve 6 configured as above can carry out spray guide combustion. In other words, the ignition plug 5, which is arranged in such a way as to be capable of directly igniting fuel injected through the fuel injection valve 6, and the fuel injection valve 6 are adapted to be capable of igniting injected fuel passing through the region 5a at any desired time regardless of the opening timing of the intake valves 9 of the internal combustion engine 1 or the position of the piston 3. Air guide combustion and wall guide combustion are also known as conventional combustion methods in which fuel injected through the fuel injection valve is ignited directly by the ignition plug. In the air guide combustion, fuel injected through the fuel injection valve is carried to the neighborhood of the ignition plug by means of air flowing into the combustion chamber with opening of the intake valve and ignited by the ignition plug. In the wall guide combustion, injected fuel is carried to the neighborhood of the ignition plug utilizing the shape of a cavity provided on top of the piston and ignited by the ignition plug. In the cases of the air guide combustion and the wall guide combustion, it is difficult to perform fuel injection and ignition unless a predetermined time for opening the intake valve is reached and a predetermined piston position is established. The spray guide combustion according to this example allows very flexible fuel injection and ignition timing control as compared to the air guide combustion and the wall guide combustion. In this example, as shown in FIG. 2, the fuel injection valve 6 and the ignition plug 5 are arranged in such a way that one of fuel sprays injected from the injection port 6a strikes the electrodes of the ignition plug 5. However, the ignition-capable region of the ignition plug 5 is not limited to the region 5a between the electrodes but includes a region around the electrode also. Therefore, it is not necessarily required that a fuel spray injected from the injection port 6a strike the electrodes of the ignition plug. In other words, it is not necessarily required that the ignition plug 5a be located in line with the direction of fuel injection from the injection port 6a (namely, on the center axis of the fuel spray). Even in the case where the fuel spray injected from the injection port 6a is offset from the electrodes of the ignition plug 5, spray guide combustion started by a spark generated between the electrodes of the ignition plug 5 can be brought about, if the fuel spray passes the ignition-capable region. Thus, in this example, what is required is that the position of the ignition plug 5 relative to the fuel injection valve 6 be arranged in such a way that spray guide combustion can be brought about. Therefore, the ignition plug 5 may be offset from the direction of fuel injection (namely, the center axis of the fuel spray) from the injection port 6a.

Returning back to FIG. 1, the intake port 7 is in communication with an intake passage 70. The intake passage 70 is provided with a throttle valve 71. An air flow meter 72 is provided in the intake passage 70 upstream of the throttle valve 71. On the other hand, the exhaust port 8 is in communication with an exhaust passage 80. An exhaust gas purification catalyst 81 for purifying the exhaust gas discharged from the internal combustion engine 1 is provided in the exhaust passage 80. As will be described later, the exhaust gas discharged from the internal combustion engine 1 has an air-fuel ratio leaner than the stoichiometry, and a selective catalytic reduction NOx catalyst capable of removing NOx in the exhaust gas having such a lean air-fuel ratio and a filter capable of trapping particulate matter (PM) in the exhaust gas may be employed as the exhaust gas purification catalyst 81.

Moreover, an electronic control unit (ECU) 20 is annexed to the internal combustion engine 1. The ECU 20 is a unit that controls the operation state of the internal combustion engine 1 and the exhaust gas purification apparatus etc. The ECU 20 is electrically connected with the aforementioned air flow meter 72, a crank position sensor 21, and an accelerator position sensor 22, and measurement values of the sensors are input to the ECU 20. Thus, the ECU 20 can recognize the operation state of the internal combustion engine 1, such as the intake air quantity based on the measurement value of the air flow meter 72, the engine speed calculated based on the measurement value of the crank position sensor 21, and the engine load calculated based on the measurement value of the accelerator position sensor 22. The ECU 20 is also electrically connected with the fuel injection valve 6, the ignition plug 5, and the throttle valve 71 etc. These components are controlled by the ECU 20.

<Basic Combustion Control>

Basic combustion control performed in the internal combustion engine 1 having the above-described configuration will now be described with reference to FIG. 3. FIG. 3(a) schematically shows procedure of fuel injection and ignition in combustion control performed in the internal combustion engine 1 in time sequence from left to right of the diagram (see upper row of FIG. 3(a)) and phenomena relating to combustion which are considered to occur in succession in the combustion chamber as results of the fuel injection and ignition (see the lower row of FIG. 3(a)). FIG. 3(b) shows relationship between first injection and second injection, which are included in the fuel injections shown in FIG. 3(a), and ignition in time line. The mode shown in FIG. 3 is given only as a schematic illustration of the basic combustion control performed in this example, and the present invention should not be considered to be limited to this mode.

In the basic combustion control of this example, first injection and second injection are performed by the fuel injection valve 6 in one combustion cycle. The first injection is fuel injection performed during the compression stroke. The second injection is fuel injection started at a time after the first injection and before the top dead center (TDC) of the compression stroke. Although the second injection is started at a time before the top dead center, it may continue past the top dead center. As shown in FIG. 3(b), the time of start of the first injection (which will be simply referred to as the "first injection time" hereinafter) is denoted by Tp, and the time of start of the second injection (which will be simply referred to as the "second injection time" hereinafter) is denoted by Tm. The interval between the first injection time and the second injection time (Tm−Tp) is defined as a first injection interval Di1. Combustion with the first injection is performed as the above-described spray guide combustion. That is to say, pre-spray of the fuel injected by the first injection (which will be hereinafter referred to as "first injected fuel") is ignited using the ignition plug 5. The time of this ignition is denoted by Ts as shown in FIG. 3(b), and the interval from the start of the first injection to the time of ignition (Ts−Tp) is defined as the ignition interval Ds.

In the following, the procedure of the basic combustion control according to the present invention will be described.

(1) First Injection

In the basic combustion control, in one combustion cycle, the first injection is firstly performed at the first injection time Tp during the compression stroke. The first injection time Tp is determined in relation to the second injection time Tm, which will be described later. As the first injection is performed, the pre-spray of the first injected fuel injected through the fuel injection valve 6 passes through the ignition-capable region 5a of the ignition plug 5 in the combustion chamber, as shown in FIG. 2. Immediately after the start of the first injection, the pre-spray of the first injected fuel is not diffused extensively in the combustion chamber but travels in the combustion chamber by the penetrating force of injection while involving the air around at the leading end of the spay jet. Consequently, the pre-spray of the first injected fuel creates stratified air-fuel mixture in the combustion chamber.

(2) Ignition of First Injected Fuel

The pre-spray of the first injected fuel thus stratified is ignited by the ignition plug 5 at the ignition time Ts after the predetermined ignition interval Ds from the first injection time Tp. As described above, since the first injected fuel is stratified, the local air-fuel ratio around the ignition plug 5 is at a level allowing combustion by this ignition even though the first injected fuel quantity (i.e. the quantity of the first injected fuel) is small. By this ignition, spray guide combustion of the first injected fuel is brought about. In other words, the ignition interval Ds is set in such a way that the spray guide combustion can be brought about. In addition to a temperature rise caused by the effect of compression by the piston 3, a temperature rise is caused in the combustion chamber by the occurrence of the spray guide combustion. However, the fuel burned by the spray guide combustion is only a part of the first injected fuel, and a large part of the first injected fuel is not burned in the combustion caused by the ignition by the ignition plug 5 but remains in the combustion chamber as "unburned residual fuel" after the ignition. This is because the air-fuel ratio of the stratified air-fuel mixture formed by the first injected fuel is so high in regions relatively distant from the inter-electrode region of the ignition plug 5 that flame cannot propagate in such regions. However, the unburned residual fuel is exposed to a high-temperature atmosphere resulting from the combustion of a portion of the first injected fuel in the combustion chamber. Therefore, it is expected that at least a portion of the unburned residual fuel is reformed in its properties to have improved combustibility, by virtue of low temperature oxidation under a condition that does not cause it to be burned. It should be noted, however, that in the context of the present invention, the unburned residue of the first injected fuel refers to a portion of the first injected fuel that remains in the combustion chamber in an unburned state without having been burned in the combustion caused by the ignition by the ignition plug 5, and it is not essential for the unburned residual fuel to be in a condition showing specific properties.

(3) Second Injection

The second injection through the fuel injection valve 6 is started at the second injection time Tm after the first injection interval Di1 from the first injection time Tp and before the top dead center of the compression stroke (in other words, at time Tm after the lapse of time equal to Di−Ds from the time of ignition Ts by the ignition plug 5). In this internal combustion engine 1, the second injected fuel self-ignites and is burned by diffusion combustion to contribute to the engine power as will be described later. Therefore, the second injection time Tm is set to such a time that nearly maximizes the engine power attained by combustion of a quantity of second injected fuel determined by the engine load and other factors. (This injection time will be hereinafter referred to as "proper injection time"). Combustion of the second injected fuel is started by flame generated by the ignition of the pre-spray of the first injected fuel as the ignition source. In other words, the first injection interval Di1 is set in such a way that the second injection time Tm is set to the proper injection time and that combustion of the second injected fuel is started by flame generated by the ignition of the pre-spray. If the second injection time Tm and the first injection interval Di1 are set in this way, the first injection time Tp is necessarily determined. After the combustion of the second injected fuel starts, the temperature in the combustion chamber rises further. Consequently, the unburned residue of the first injected fuel and the second injected fuel self-ignite in the raised temperature field and are burned by diffusion combustion. In connection with this, in cases where the combustibility of the unburned residue of the first injected fuel has been enhanced, the self-ignition of fuel after the start of the second injection is expected to be further promoted.

As described above, in the basic combustion control according to this example, the above-described series of combustion is caused to occur by the first injection, ignition, and second injection. In this specification, the correlation between the first injection and second injection that enables the combustion of the second injected fuel to be started by flame generated by the ignition of the pre-spray of the first injected fuel and then enables the unburned residue of the first injected fuel and the second injected fuel to self-ignite and be burned by diffusion combustion will be referred to as the "first-second injection correlation". In other words, the basic combustion control according to this embodiment is adapted to perform the first injection and the second injection that is in the first-second injection correlation with the ignition of the first injected fuel.

FIG. 4 shows the changes of rate of heat release in the combustion chamber in a case where the basic combustion control according to this example is performed. FIG. 4 shows the changes of the rate of heat release corresponding to four different control modes L1 to L4 in a case where the engine speed of the internal combustion engine 1 is 2000 rpm. In these control modes L1 to L4, while the first injection time Tp, the first injected fuel quantity (i.e. the duration of the first injection), the second injection time Tm, and the ignition time Ts are the same among the control modes, the second injected fuel quantity (i.e. the duration of the second injection) is varied among the control modes. Specifically, the second injected fuel quantity is varied like L1>L2>L3>L4. Therefore, FIG. 4 shows variation of the change of the rate of heat release resulting from variation in the second injected fuel quantity under the presupposition that the first-second injection correlation is established.

In FIG. 4, the rate of heat release shows a first peak in a portion Z1 encircled by a broken line. This first peak indicates heat generated by the combustion of the first injected fuel started by ignition (that is, heat generated by the spray guide combustion). At the time at which the rate of heat release shows the first peak, the second injection has not been performed yet, and flame generated by ignition of the first injected fuel and the unburned residual fuel, which is the portion of the first injected fuel that has not been burned by the ignition, are present in the combustion chamber. Now, the unburned residue of the first injected fuel will be discussed with reference to FIG. 5. FIG. 5 shows correlation of the first injected fuel quantity and the combustion efficiency of the first injected fuel (which will be hereinafter referred to as the "first combustion efficiency") for three combustion conditions L5 to L7, in the case where the first injection is performed according to the basic combustion control. Specifically, the first injection time Tp and the ignition time Ts, which are the combustion conditions, are advanced in the order of L5, L6, and L7, while the ignition interval Ds or the interval between time Tp and time Ts is fixed. FIG. 5 shows the above-described correlation in the case where only the first injection and ignition are performed but the second injection is not performed (namely, in the case where only the spray guide combustion is performed).

The first combustion efficiency and the unburned residue rate of the first injected fuel are in a relationship represented by the following equation 1. Specifically, the higher the combustion efficiency is, the lower the unburned residue rate is.

[Math.1]

$$(\text{unburned residue rate of pre-injected fuel}) = 1 - (\text{combustion efficiency of pre-injected fuel}) \quad \text{(equation 1)}$$

Referring to FIG. 5, if the first injection time Tp and the ignition time Ts are advanced (namely, the first injection interval Di1 is increased) while the first injected fuel quantity is fixed, the combustion efficiency of the first injected fuel tends to decrease, and the unburned residue rate tends to increase consequently. Conversely, even if the first injected fuel quantity is changed, it is possible to keep the combustion efficiency of the first injected fuel and the unburned residue rate constant by adjusting the degree of advancement of the first injection time Tp and the ignition time Ts. As described above, the basic combustion control according to this example can control the unburned residue rate of the first injected fuel, which is one of the factors of the first-second injection correlation, by controlling the first injected fuel quantity, the first injection time Tp, and the ignition time Ts (i.e. the first injection interval Di1).

Referring back to FIG. 4, the second injection is started at time Tm after the time at which the rate of heat release shows the first peak and before the top dead center of the compression stroke. Then, as described before, the second injected fuel is ignited by flame generated by the ignition of the pre-spray of the first injected fuel to start to burn, and thereafter self-ignites together with the unburned residue of the first injected fuel to burn by diffusion combustion. Consequently, a second peak, which is the highest peak, of the rate of heat release occurs at a time after the top dead center of the compression stroke. In the case shown in FIG. 4, as the second injected fuel quantity increases (namely as the duration of the second injection increases), the value of the second peak of the rate of heat release increases, and the time at which the second peak occurs becomes later. This means that as the second injected fuel quantity increases, the duration of the combustion of the second injected fuel increases. It is conjectured from this that the second injected fuel and the unburned residue of the first injected fuel are subjected to diffusion combustion or combustion that can be regarded to be substantially equivalent to diffusion combustion.

Self-ignition of fuel occurring in the basic combustion control according to this example will be described with reference to FIG. 6. FIG. 6 shows the change of the rate of heat release in the combustion chamber for two modes L8 and L9 between which the ratio of the first injected fuel quantity and the second injected fuel quantity is different, while the total injection quantity (i.e. the sum of the first injected fuel quantity and the second injected fuel quantity) in one combustion cycle is kept constant. In the case shown in FIG. 6, the engine speed of the internal combustion engine 1 is 2000 rpm. The proportion of the first injected fuel quantity is larger in mode L9 than in mode L8. In other words, the first injected fuel quantity is larger and consequently the unburned residue of the first injected fuel is also larger in mode L9 than in mode L8. As will be seen in FIG. 6, the value of the second peak of the rate of heat release occurring after the top dead center of the compression stroke is higher in mode L9 than in mode L8. Moreover, the falling rate from the second peak of the rate of heat release (or the inclination of the curve in the graph after the second peak) is higher in mode L9 than in mode L8. It is conjectured that the above facts suggest that after the start of the second injection, combustion of the unburned residue of the first injected fuel and the second injected fuel caused by self-ignition is more promoted (namely the proportion of fuel burned by self-ignition is larger, and the proportion of fuel burned by diffusion combustion is smaller) in mode L9 than in mode L8. It is considered from this that the unburned residue of the first injected fuel contributes to the promotion of self-ignition after the second injection. The inventors of the present invention verified that in the basic combustion control of this example, the self-ignition of fuel after the second injection is promoted also in the case where the unburned residue of the first injected fuel is increased by controlling the first injection time Tp and the ignition time Ts as well as the first injected fuel quantity. To sum up, in the basic combustion control according to this example, it is possible to promote self-ignition in burning unburned residue of the first injected fuel and the second injected fuel after the start of the second injection, by controlling parameters relating to the first injection and the ignition to increase the unburned residue rate.

As described above, in the basic combustion control according to this example, self-ignition and diffusion combustion of fuel is caused to occur by performing the second injection after the spray guide combustion caused by the first injection and the ignition by the ignition plug 5. Therefore, the combustion caused by the basic combustion control is similar to what is called diesel combustion or can be regarded to be substantially equivalent to diesel combustion. Consequently, the air-fuel ratio of the air-fuel mixture in the combustion chamber is allowed to be very high or lean (in the range between approximately 20 and 70). To bring about combustion at such lean air-fuel ratio, in the combustion control according to this example, the throttle valve 71 is opened to a degree larger than in the case of conventional combustion control (homogeneous stoichiometry control) for gasoline engines. Consequently, the pump loss in the internal combustion engine 1 can be made smaller. Moreover, since the combustion that contributes to the engine power is brought about by self-ignition and diffusion combustion, the cooling loss in the internal combustion engine 1 can also be made smaller than in the case of the homogenous stoichiometry control. In consequence, the basic combustion control according to this example can attain high thermal efficiency that cannot be attained by conventional combustion control for gasoline engines.

<Description of First-Second Injection Correlation>

In the following, the first injected fuel quantity, the second injected fuel quantity, and the first injection interval, which are relevant technical factors for establishing the aforementioned first-second injection correlation, will be specifically described.

The second injection time is set to the proper injection time that nearly maximizes the engine power of the internal combustion engine 1. Therefore, the engine power required by an increase in the engine load can be attained up to some extent by increasing the second injected fuel quantity. However, since the second injection is performed at a time near the top dead center of the compression stroke at which the pressure in the combustion chamber is very high, the penetration of the fuel spray injected by the fuel injection valve 6 is low. In other words, the fuel spray injected by the second injection is hard to diffuse extensively. For this reason, if the second injected fuel quantity is increased too much, the quantity of oxygen existing around the spray of the second injected fuel or the quantity of oxygen available for combustion of the second injected fuel becomes insufficient relative to the quantity of fuel, possibly leading to an increase in the amount of smoke generated. Furthermore, in the basic combustion control according to this example, it is necessary that self-ignition of fuel occur after the second injection. If the second injected fuel quantity is excessively large, there is a possibility that the temperature in the combustion chamber may be lowered by the evaporation latent heat of the second injected fuel to make the combustion unstable.

On the other hand, the first injection is performed at the first injection time Tp during the compression stroke. Therefore, combustion of the first injected fuel ignited by the ignition plug 5 may be considered to be counteractive to the engine power of the internal combustion engine 1. However, what is required in the combustion of the pre-spray of the first injected fuel caused by ignition is only to produce flame serving as an ignition source for combustion of the second injected fuel. Therefore, the fuel burned in the combustion caused by the ignition is only a portion of the first injected fuel. Consequently, the effect of the spray guide combustion of the first injected fuel counteractive to the engine power is small. The unburned residue of the first injected fuel that has not been burned in the combustion caused by the ignition by the ignition plug 5 is burned in self-ignition and diffusion combustion together with the second injected fuel after the second injection to contribute to the engine power. Therefore, the engine power required by an increase in the engine load can be attained up to some extent also by increasing the first injected fuel quantity and increasing its unburned residue rate.

As described before, the first injection interval Di1, which is the interval between the first injection time and the second injection time in the basic combustion control according to this example, is set in such a way that combustion of the second injected fuel is started by flame generated by ignition of the pre-spray of the first injected fuel. Moreover, the first injection interval Di1 is determined taking into consideration the thermal efficiency of the overall combustion, the quantity of the unburned residue of the first injected fuel, and the amount of smoke generated.

FIG. 7 shows relationship between the first injection interval Di1 and the thermal efficiency of the internal combustion engine 1. FIG. 7 shows this relationship in a case where the first injection interval Di1 is varied with the first injected fuel quantity, the second injected fuel quantity, and the ignition interval Ds being fixed.

In this example, the first injection and the second injection subsequent to it are performed by means of one fuel injection valve 6. Because of its mechanical structure, a fuel injection valve generally has a minimum injection interval that can be set in performing multiple times of injection consecutively. In FIG. 7, the range of the first injection interval that is infeasible because of the mechanical limitation of the fuel injection valve 6 (i.e. the range of Di1 below Di1a) is indicated as a mechanical limitation range R1. On the other hand, as the first injection interval Di1 is increased, the second injection is performed at a time closer to the end of the combustion process started by ignition of the first injected fuel. In the period close to the end of the combustion process, since the combustion of the first injected fuel is about to end, it is difficult for combustion of the second injected fuel to be started by flame generated by combustion of the first injected fuel. For this reason, if the first injection interval Di1 is too large, there is a possibility that it may be impossible to burn the second injected fuel, leading to misfire. In FIG. 7, the range of the first injection interval Di1 in which misfire is highly likely to occur (i.e. the range of Di1 above Di1b) is indicated as a misfire occurrence range R2. The lower bound (Di1b in FIG. 7) of the misfire occurrence range R2 changes depending on the first injected fuel quantity. If the first injected fuel quantity is increased, the duration of the combustion of the first injected fuel started by ignition will continue for a longer period of time. Then, the second injected fuel can be burned with a longer first injection interval Di1.

As per the above, considering the thermal efficiency, it is preferred that the first injection interval Di1 be set to Di1x, which falls in the range Rd defined by the lower bound Di1a and the upper bound Di1b and at which the thermal efficiency of the internal combustion engine 1 has its peak value in FIG. 7.

As described before, in the basic combustion control according to this example, combustion of the second injected fuel is started by flame generated by combustion of the first injected fuel, and the second injected fuel self-ignites and is burned by diffusion combustion together with the unburned residue of the first injected fuel. In the early stage of combustion of the second injected fuel, flame generated by combustion of the first injected fuel and the unburned residue of the first injected fuel are distributed unevenly in the combustion chamber, and mixing of the second injected fuel and air in the combustion chamber tends not to be promoted. Therefore, if the unburned residue of the first injected fuel and the second injected fuel overlap in the combustion chamber at the time when the second injection is performed, the amount of oxygen present around the overlapping region or the amount of oxygen available for combustion of the fuel in the overlapping region can be insufficient relative to the amount of fuel, and smoke is likely to be generated. The generation of smoke suggests that combustion is not proceeding in a good condition. Thus, the larger the amount of smoke generated is, the lower the thermal efficiency tends to be. To reduce the generation of smoke, it is necessary to reduce the overlapping of the unburned residue of the first injected fuel and the second injected fuel. However, as described above, the second injection time is set to the proper injection time before the top dead center of the compression stroke in order to improve the thermal efficiency of the internal combustion engine 1. Therefore, in order to reduce the overlapping of the unburned residue of the first injected fuel and the second injected fuel, which tends to lead to the generation of smoke, it is preferred to adjust the first injection interval Di1 while setting the second injection time to the proper injection time, namely it is preferred to adjust the first injection time.

FIG. 8 shows relation between the amount of smoke generated and the first injection time Tp (see graph (b) in FIG. 8) and relation between the thermal efficiency and the first injection time Tp (see graph (c) of FIG. 8) for three modes (see diagram (a) of FIG. 8), among which the proportion of the first injected fuel quantity and the second injected fuel quantity is varied with the total quantity of the first injected fuel and the second injected fuel being fixed, where the second injection time Tm is fixed at a predetermined time before the top dead center of the compression stroke and the first injection time Tp is varied. The ignition interval Ds (i.e. the length of time from the first injection time Tp to the ignition time Ts) is the same among all the modes. The relationships between the first injected fuel quantity and the second injected fuel quantity in respective modes 1 to 3 are as follows:

Mode 1: first injected fuel quantity=X1, second injected fuel quantity=Y1,

Mode 2: first injected fuel quantity=X2, second injected fuel quantity=Y2, and

Mode 3: first injected fuel quantity=X3, second injected fuel quantity=Y3, where X1>X2>X3, and Y1<Y2<Y3.

In graph (b) in FIG. 8, the change of amount of smoke in mode 1 is represented by L11, the change of amount of smoke in mode 2 is represented by L12, and the change of amount of smoke in mode 3 is represented by L13. In graph (c) of FIG. 8, the change of the thermal efficiency in mode 1 is represented by L14, the change of the thermal efficiency in mode 2 is represented by L15, and the change of the thermal efficiency in mode 3 is represented by L16. In graph (b), (c) of FIG. 8, measurement points of the smoke and the thermal efficiency in mode 1 are represented by circles, measurement points of the smoke and the thermal efficiency in mode 2 are represented by triangles, and measurement points of the smoke and the thermal efficiency in mode 3 are represented by rhombuses. The measurement points of the smoke and the thermal efficiency with the first injection time Tp that makes the thermal efficiency highest in the respective modes are represented by solid black circle, triangle, and rhombus.

Here, we consider shift from mode 3 to mode 2 and then to mode 1 while focusing on the aforementioned solid black measurement points. As we can see, by increasing the first injected fuel quantity and advancing the first injection time Tp, it is possible to keep the thermal efficiency of the internal combustion engine 1 at around the highest level while reducing or keeping the amount of smoke generated (see graph (b) in FIG. 8). If the sum total of the first injected fuel quantity and the second injected fuel quantity is the same, increasing the first injected fuel quantity necessarily leads to a decrease in the second injected fuel quantity. However, by advancing the first injection time Tp when the first injected fuel quantity is increased, it is possible to increase the unburned residue of the first injected fuel (namely it is possible to increase the unburned residue rate). It is considered that this is because if the first injection time is advanced, the first injection is performed when the pressure in the combustion chamber is lower and consequently, the penetration of the pre-spray of the first injected fuel is relatively higher to facilitate diffusion of the first injected fuel in the combustion chamber. Thus, since the first injected fuel is diffused more extensively in the combustion chamber, the quantity of unburned residual fuel to which flame generated by ignition has not propagated increases. Consequently, a larger quantity of unburned residual fuel is subjected to self-ignition and diffusion combustion together with the second injected fuel after the start of the second injection. In consequence, a decrease in the output power due to a decrease in the second injected fuel quantity can be compensated for by an increase in the power provided by combustion of the unburned residue of the first injected fuel. Moreover, the extensive diffusion of the first injected fuel in the combustion chamber can reduce the overlapping of the unburned residue of the first injected fuel and the second injected fuel after the second injection. Therefore, the generation of smoke due to the overlapping of the unburned residue of the first injected fuel and the second injected fuel can also be reduced. Thus, by increasing the first injected fuel quantity and advancing the first injection time Tp, it is possible to reduce the amount of smoke generated while keeping the thermal efficiency of the internal combustion engine 1 at a satisfactory level.

It will be understood from graph (c) in FIG. 8 that if it is assumed that the first injection is performed according to modes 1 to 3 while fixing the first injection time Tp to, for example, the time Ta at which the highest thermal efficiency is attained in mode 3, as the first injected fuel quantity is increased, the amount of smoke generated increases and the thermal efficiency of the internal combustion engine 1 decreases. It will be understood from this fact also that the above-described way of controlling the first injection in which the injection time Tp is advanced with increases in the first injected fuel quantity is effective in terms of reduction of smoke and improvement in the thermal efficiency.

<High Load Combustion Control>

In the following, combustion control during the high load operation in the internal combustion engine 1 according to this example will be described. In the internal combustion engine 1 according to this example, when the engine load increases, it is necessary to increase the quantity of fuel injected into the combustion chamber. However, as described above, if the second injected fuel quantity is increased too much, there is a possibility that the amount of smoke may increase and/or the temperature in the combustion chamber may be lowered by the evaporation latent heat of the second injected fuel to make the combustion unstable. As described above, when the first injected fuel quantity is increased, it is possible to reduce the amount of smoke generated by advancing the first injection time Tp, namely by increasing the first injection interval Di1, accordingly. However, the first injection interval Di1 has an upper bound (Di1b in FIG. 7) as shown in FIG. 7, because it is necessary that flame generated by ignition of the first injected fuel serves as an ignition source for combustion of the second injected fuel. If the first injected fuel quantity is further increased with the first injection interval Di1 being kept at the aforementioned upper bound, the unburned residue of the first injected fuel and the second injected fuel are apt to overlap when the second injection is performed. Therefore, if the quantity of the first injected fuel is increased too much, there is a possibility that the amount of smoke generated may increase. In view of this, in the internal combustion engine 1 according to this example, in the high load range in which the quantity of fuel required to be injected into the combustion chamber in one combustion cycle is relatively large, the third injection through the fuel injection valve 6 is performed in addition to the first fuel injection and the second fuel injection performed in the above-described basic combustion control.

The third fuel injection is performed at a third injection time prior to the first injection time during the compression stroke with a second injection interval Di2 between third injection time and the first injection time. The second injection interval Di2 is set in such a way that the fuel injected by the third injection (which will be hereinafter referred to as the third injected fuel) is burned by self-ignition or diffusion combustion after the start of the second injection. In the following, the combustion control in which the third injection is performed in addition to the basic combustion control will be referred to as the "high load combustion control".

FIG. 9 shows the change of the rate of heat release in the combustion chamber in the case where the basic combustion control is performed and in the case where the high load combustion control is performed. Diagram (a) in FIG. 9 shows when the fuel injections and ignition are performed in the respective combustion controls. In graph (b) in FIG. 9, curve L17 represents the change in the rate of heat release in the case where the basic combustion control is performed, and curve L18 represents the change in the rate of heat release in the case where the high load combustion control is performed. In the cases shown in FIG. 9, the sum total of the injection quantity in one combustion cycle is the same among the two combustion controls. Thus, the second injected fuel quantity is smaller in the high load combustion control than in the basic combustion control. In the high load combustion control, a quantity of fuel equal to the difference in the second injected fuel quantity from that in the case of the basic combustion control is injected by the third injection. In the case shown in FIG. 9, the engine speed of the internal combustion engine 1 is 2000 rpm.

Since the third injection time Tpp is prior to the first injection time Tp during the compression stroke, the pressure in the combustion chamber at the third injection time Tpp is lower than that at the first injection time Tp. Therefore, the penetration of the spray of the third injected fuel is relatively high, and consequently the third injected fuel tends to diffuse more extensively in the combustion chamber than the first injected fuel. Therefore, if the second injection interval Di2 is set appropriately, it is possible to prevent most part of the third injected fuel from being burned by flame generated by ignition of the pre-spray of the first injected fuel and to enable it to be burned by self-ignition or diffusion combustion after the start of the second injection. In graph (b) in FIG. 9, the first peak of the rate of heat release L18 (which is the peak of the rate of heat release attributed to combustion caused by ignition of the pre-spray of the first injected fuel) is substantially the same as the first peak of the rate of heat release L17 in its time of occurrence and magnitude. It is conjectured from this that the third injected fuel is not burned upon ignition of the pre-spray of the first injected fuel.

It is considered that the third injected fuel, which is burned by self-ignition or diffusion combustion after the start of the second injection, acts in the same manner as the unburned residue of the first injected fuel in the combustion. In graph (b) in FIG. 9, the second peak of the rate of heat release L18 (or the maximum peak of the rate of heat release occurring after the top dead center of the compression stroke) is higher than the second peak of the rate of heat release L17. Moreover, the falling rate from the second peak of the rate of heat release (i.e. the inclination of the graph after the second peak) is higher in L18 than L17. It is conjectured from this also that the third injected fuel is contributive in facilitating self-ignition of fuel after the second injection, as with the unburned residue of the first injected fuel.

Since the third injection time is prior to the first injection time, the third injected fuel has diffused more extensively in the combustion chamber than the unburned residue of the first injected fuel at the time when the second injection is performed. Therefore, although the third injected fuel is present in the combustion chamber at the time when the second injection is performed, the third injected fuel is less likely to overlap with the second injected fuel than the unburned residue of the first injected fuel. Therefore, the third injected fuel is less likely to be a cause of smoke than the first injected fuel and the second injected fuel.

In the case where the third injection is performed, at least one of the first injected fuel quantity and the second injected fuel quantity can be made smaller than in the case where a quantity of fuel required by the engine load of the internal combustion engine is injected only by the first injection and the second injection. Therefore, performing the third injection can reduce the amount of smoke derived from the first injected fuel or the second injected fuel. FIG. 10 shows relationship between the thermal efficiency of the internal combustion engine 1 and the third injected fuel quantity (graph (a) in FIG. 10) and relationship between the amount of smoke generated and the third injected fuel quantity (graph (b) in FIG. 10) in the high load combustion control, where the third injected fuel quantity is varied with the total injection quantity by all the injections in one combustion cycle being fixed. In the case shown in FIG. 10, increases in the third injected fuel quantity are counterbalanced by decreases in the second injected fuel quantity. In the case shown in FIG. 10, the first injected fuel quantity is fixed. From graph (a) in FIG. 10, it is seen that if the third injected fuel quantity is increased in the high load combustion control, the thermal efficiency of the internal combustion engine 1 is kept nearly constant. This also shows that the most part of the third injected fuel contributes to combustion after the start of the second injection. From graph (b) in FIG. 10, it is seen that increasing the third injected fuel quantity in the high load combustion control leads to decreases in the amount of smoke generated. This also shows that the third injected fuel is unlikely to be a cause of smoke.

Therefore, in the internal combustion engine 1 according to this example, the high load combustion control as described above is performed in the high load operation state in which the total fuel injection quantity is large, whereby diesel combustion can be caused to occur with reduced smoke as compared to that with the basic combustion control, also in the high load operation state.

<Combustion Control Flow>

In the following, a control flow of the combustion control according this example will be described with reference to FIGS. 11 to 13. FIGS. 11 and 12 are flow charts of the control flow of the combustion control according to this example. This control flow is stored in the ECU 20 in advance and carried out repeatedly at regular intervals by executing a control program stored in the ECU 20 while the internal combustion engine 1 is operating.

FIG. 13 shows exemplary control maps used in the combustion control according to this example. In the upper graph (a) in FIG. 13, line L21 represents relationship between the engine load of the internal combustion engine 1 and the first injected fuel quantity, line L22 represents relationship between the engine load and the second injected fuel quantity, line L23 represents relationship between the engine load and the third injected fuel quantity, and line L20 represents relationship between the engine load and the load-adapted injection quantity, which is the fuel injection quantity adapted to the engine load. Moreover, the upper graph (a) in FIG. 13 also shows the amount of unburned residue M1 of the first injected fuel that has not been burned in combustion caused by ignition by the ignition plug 5. In the upper graph (a) in FIG. 13, S1 is a fuel injection quantity corresponding to the engine load on the border between an operation range R3 (which will be hereinafter referred to as the low load range R3) and another operation range R4 (which will be hereinafter referred to as the first middle load range R4). This fuel injection quantity S1 will be hereinafter referred to as the first predetermined quantity S1. Furthermore, S2 (>S1) is a fuel injection quantity corresponding to the engine load on the border between the first middle range R4 and another operation range R5 (which will be hereinafter referred to as the second middle load range R5). This fuel injection quantity S2 will be hereinafter referred to as the second predetermined quantity S2. Furthermore, S3 (>S2) is a fuel injection quantity corresponding to the engine load on the border between the second middle load range R5 and another operation range R6 (which will be hereinafter referred to as the high load range R6). This fuel injection quantity S3 will be hereinafter referred to as the third predetermined quantity S3. In this example, when the engine load of the internal combustion engine 1 falls in the low load range R3, the first middle load range R4, or the second middle load range R5, the above-described basic combustion control is performed. On the other hand, when the engine load falls in the high load range R6, the above-described high load combustion control is performed. Thus, in this example, the engine load on the border between the second middle load range R5 and the high load range R6 is the "predetermined load" as defined in the present invention. Details of the different load ranges will be described later.

In the lower graph (b) in FIG. 13, line L31 represents relationship between the engine load of the internal combustion engine 1 and the first injection time Tp, line L30 represents relationship between the engine load and the ignition time Ts, line L32 represents relationship between the engine load and the second injection time Tm, and line L33 represents relationship between the engine load and the third injection time Tpp. The distance between line L31 and line L32 represents the first injection interval Di1, the distance between line L31 and line L30 represents the ignition interval Ds, and the distance between line L33 and line L31 represents the second injection interval Di2. The vertical axis of graph (b) in FIG. 13 represents the crank angle from the top dead center of the compression stroke, where larger values represent earlier times during the compression stroke.

In the control flow according to this example, first in step S101, the engine load of the internal combustion engine is calculated based on the measurement value of the accelerator position sensor 22. Alternatively, the engine load of the internal combustion engine 1 may be calculated based on the air flow rate in the intake passage 70, namely the measurement value of the air flow meter 72 or the intake air pressure in the intake passage 70. Then, in step S102, a load-adapted injection quantity S0 is calculated based on the engine load calculated in step S101. Specifically, the load-adapted injection quantity S0 adapted to the engine load is calculated using the control map represented by line L20 in graph (a) in FIG. 13. In this example, the relationship between the engine load and the load-adapted injection quantity S0 is recorded in the control map in which the load-adapted injection quantity S0 increases as the engine load increases, as represented by line L20.

Then, in step S103, the second injection time Tm is determined using the control map represented by line L32 in graph (b) in FIG. 13. As described above, in order to improve the thermal efficiency of the internal combustion engine 1, the second injection time Tm is set to the proper injection time before the top dead center of the compression stroke. The proper injection time of the internal combustion engine 1 has been measured by experiment conducted previously for every value of the engine load, and the control map represented by line L32 has been prepared based on the result of measurement. The second injection time Tm is gradually advanced as the engine load increases up to a certain engine load. However, in the second middle load range R5 and the high load range R6 (namely in the range in which the load-adapted injection quantity S0 is equal to or larger than S2), the degree of advancement is kept at an upper limit value. This is because the second injection time Tm is determined in accordance with the second injected fuel quantity Sm, which is fixed to a maximum second injected fuel quantity Smmax in the second middle load range R5 and the high load range R6, as will be described later.

Then, in step S104, it is determined whether or not the load-adapted injection quantity S0 calculated in step S102 is equal to or smaller than the first predetermined quantity S1, in other words, it is determined whether or not the engine load of the internal combustion engine 1 is in the low load range R3. The low load range R3 is defined as an operation range in which the load-adapted injection quantity is so small that even if only the second injected fuel quantity Sm is increased in response to increases in the engine load, the possibility of increase in the amount of smoke and the possibility of unstable combustion due to the evaporation latent heat of the second injected fuel are low. If the determination made in step S104 is affirmative, the processing of step S105 is executed next. If the determination made in step S104 is negative, the processing of step S110 is executed next.

If the determination made in step S104 is affirmative, namely if the load-adapted injection quantity S0 is equal to or smaller than the first predetermined quantity S1 (in other words, if the engine load of the internal combustion engine 1 is in the low load range R3), the first injected fuel quantity Sp is set to the minimum first injected fuel quantity Spmin based on the control map represented by line L21 in graph (a) in FIG. 13. The minimum first injected fuel quantity Spmin is the smallest value of the first injected fuel quantity that can generate flame serving as an ignition source for starting combustion of the second injected fuel, when the second injection is performed. If the first injected fuel quantity Sp is large, combustion caused by ignition by the ignition plug 5 (i.e. spray guide combustion) is facilitated, and therefore the unburned residue rate of the first injected fuel may become small. Setting the first injected fuel quantity Sp to the minimum first injected fuel quantity Spmin can make the unburned residue rate as high as possible. Therefore, in the low load range R3, the first injected fuel quantity Sp is set to the minimum first injected fuel quantity Spmin. Thus, it is possible to attain high thermal efficiency while ensuring stable combustion. As described above, in the low load range R3, only the second injected fuel quantity Sm is increased in response to increases in the engine load, and the first injected fuel quantity Sp is fixed to the minimum first injected fuel quantity Spmin, in the low load range R3, as represented by line L21 in graph (a) in FIG. 13.

Then, in step S106, the first injection time Tp is determined using the control map represented by line L31 in graph (b) in FIG. 13. In this processing step, the first injection time Tp is determined in relation to the second injection time Tm set in step S103 in such a way as to set an appropriate first injection interval Di1 with which a satisfactory thermal efficiency is attained when the first injected fuel quantity Sp is the minimum first injected fuel quantity Spmin. As described above, in the low load range R3, the first injected fuel quantity Sp is fixed at the minimum first injected fuel quantity Spmin. Consequently, the first injection interval Di1 is also kept constant in the low load range R3. Therefore, in the low load range R3, when the second injected time Tm is changed in response to a change in the engine load, the first injection time Tp is also changed in accordance with the change of the second injection time Tm.

Then, in step S107, the ignition time Ts is determined using the control map represented by line L30 in graph (b) in FIG. 13. As shown in graph (b) in FIG. 13, the ignition interval Ds, which is the interval between the first injection time Tp and the ignition time Ts, is kept constant. Therefore, in the low load range R3, when the first injection time Tp is changed in accordance with the change of the second injection time Tm, the ignition time Ts is also changed in accordance with the change of the first ignition time Tp.

Then, in step S108, the second injected fuel quantity Sm is determined using the control map represented by line L22 in graph (a) in FIG. 13. In the low load range R3, the relationship represented by line L22 between the engine load (the load-adapted injection quantity S0) and the second injected fuel quantity Sm is expressed by the following equation 2:

[Math.2]

$$Sm = S0 - Sp \times \alpha \qquad \text{(equation 2)},$$

where alpha is the unburned residue rate of the first injected fuel.

As described before, in the basic combustion control according to this example, the unburned residue of the first injected fuel self-ignites and is burned by diffusion combustion together with the second injected fuel to contribute to the engine power. Therefore, in terms of contribution to the engine power, a portion of the first injected fuel or the unburned residue of the first injected fuel can be regarded to be equivalent to the second injected fuel. Therefore, an appropriate value of the first injected fuel quantity Sm can be determined by determining a factor alpha representing the unburned residue rate of the first injected fuel in advance by an experiment and calculating the first injected fuel quantity Sm according to the above equation 2, which takes into account this factor alpha. The unburned residue rate of the first injected fuel changes depending on the ignition interval Ds and the first injection interval Di1. Hence, the value of the factor alpha is determined based on them. In the low load range R3, since the ignition interval Ds and the first injection interval Di1 are both constant, the factor alpha in the above equation 2 is also a constant value. Moreover, in the low load range R3, the first injected fuel quantity Sp is fixed at the minimum first injected fuel quantity Spmin for the above-described reason, and hence Sp=Spmin in the above equation 2. In cases where the quantity of fuel burned by ignition by the ignition plug 5 (that is, the quantity of fuel burned by spray guide combustion) is very small relative to the first injected fuel quantity, the factor alpha may be set to be equal to 1 in the control process. In this case, the control is performed in such a way that the total injection quantity is equal to the load-adapted injection quantity. After the completion of the processing of step S108, the processing of step S130 is executed.

With the parameters relating to the first injection, the second injection, and the ignition determined in the above-described manner, an amount of unburned residue of the first injected fuel represented by M1 in graph (a) in FIG. 13 remains after the ignition of the pre-spray of the first injected fuel, in the low load range R3. As described above, in the low load range R3, the first injected fuel quantity Sp is fixed at the minimum first injected fuel quantity Spmin, and the ignition integral Ds and the first injection interval Di1 are constant. Consequently, the quantity of the unburned residue of the first injected fuel is substantially constant.

If the determination made in step S104 is negative, namely if the load-adapted injection quantity S0 is larger than the first predetermined quantity S1, it is determined in step S110 whether or not the load-adapted injection quantity S0 determined in step S102 is equal to or smaller than the second predetermined quantity S2, in other words, it is determined whether or not the engine load of the internal combustion engine 1 is in the first middle load range R4. The first middle load range R4 is defined as an operation range in which if only the second injected fuel quantity Sm is increased in response to an increase in the engine load, the possibility of increase in the amount of smoke and the possibility of unstable combustion due to the evaporation latent heat of the second injected fuel are high. Therefore, in the first middle load range R4, not only the second injected fuel quantity Sm but also the first injected fuel quantity Sp is increased in response to increases in the engine load. The second predetermined quantity S2 is set as a fuel injection quantity adapted to the engine load above which the second injected fuel quantity Sm is set to its largest allowable value (a maximum second injected fuel quantity Smmax) in view of the amount of smoke generated and the combustion stability, namely, the engine load for which the quantity of fuel that can be injected at the proper injection time reaches the largest allowable value. If the determination made in step S110 is affirmative, the processing of step S112 is executed next. If the determination made in step S110 is negative, the processing of step S120 is executed.

If the determination made in step S110 is affirmative, in other words, if the load-adapted injection quantity S0 is larger than the first predetermined quantity S1 and equal to or smaller than the second predetermined quantity S2 (namely, if the engine load of the internal combustion engine 1 is in the first middle load range R4), the first injected fuel quantity Sp is determined using the control map represented by line L21 in graph (a) in FIG. 13, in step S111. In this processing step, the higher the engine load of the internal combustion engine 1 is, the larger the first injected fuel quantity Sp is. Consequently, the higher the engine load of the internal combustion engine 1 is, the larger the quantity of the unburned residue of the first injected fuel is. Then, in step S112, the first injection time Tp is determined using the control map represented by line L31 in graph (b) in FIG. 13. When the first injected fuel quantity Sp is increased in response to an increase in the engine load of the internal combustion engine 1, if the first injection interval Di1, which is the interval between the first injection time Tp and the second injection time Tm, is fixed, the larger the first injected fuel quantity Sp is, the more likely the unburned residue of the first injected fuel and the second injected fuel overlap when the second injection is performed, and the more the amount of smoke increases. In view of this, the higher the engine load of the internal combustion engine 1 is, the more the first injection time Tp is advanced in such a way as to increase the first injection interval Di1. In other words, in the first middle load range R4, the first injection time Tp is advanced to a degree larger than the degree of advancement of the second injection time Tm, and the higher the engine load is, the larger the degree of advancement of the first injection time Tp is. Controlling the first injection time Tp in this way can reduce the overlapping of the first injected fuel and the second injected fuel even when the quantity of the unburned reside of the first injected fuel increases due to an increase in the first injected fuel quantity Sp. In consequence, the amount of smoke generated due to the overlapping of them can be reduced. Moreover, although the quantity of the unburned residue of the first injected fuel increases with increases in the engine load, the unburned residue is burned in combustion occurring after the start of the second injection to contribute to the engine power, as described above, and therefore the thermal efficiency of the internal combustion engine 1 can be kept at high levels.

Then, in step S113, the ignition time Ts is determined using the control map represented by line L30 in graph (b) in FIG. 13. As shown in graph (b) FIG. 13, in the first middle load range R4 also, the ignition interval Ds, which is the interval between the first injection time Tp and the ignition time Ts, is kept constant. Therefore, when the first injection time Tp is advanced to a degree larger than the degree of advancement of the second injection time Tm, the ignition time Ts is also advanced to a degree same as the first injection time Ts.

Then, in step S114, the second injected fuel quantity Sm is determined using the control map represented by line L22 in graph (a) in FIG. 13. In the first middle load range R4 also, as with in the low load range R3, the relationship represented by line L22 between the engine load (the load-adjusted injection quantity S0) and the second injected fuel quantity Sm is expressed by the aforementioned equation 2. Therefore, the second injected fuel quantity Sm can be determined taking into account characteristics of the basic combustion control according to this example, as with in the processing of step S108. As described before, in the first middle load range R4, the first injected fuel quantity Sp is increased in response to increases in the engine load. Therefore, the increase rate of the second injected fuel quantity Sm (which is the rate of the increase in the second injected fuel quantity Sm to the increase in the engine load) in the first middle load range R4 is smaller than the increase rate of the second injected fuel quantity Sm in the low load range R3, in which the first injected fuel quantity Sp is fixed. Therefore, it is possible to reduce the increase in the smoke due to the increase in the second injected fuel quantity and the occurrence of misfire due to the increase in the evaporation latent heat of the second injected fuel. After the completion of the processing of step S114, the processing of step S130 is executed.

With the parameters relating to the first injection, the second injection, and the ignition determined in the above-described manner, an amount of unburned residue of the first injected fuel represented by M1 in graph (a) in FIG. 13 remains after the ignition of the pre-spray of the first injected fuel, in the first middle load range R4. As described above, in the first middle load range R4, the first injected fuel quantity Sp is increased in response to increases in the engine load, and the first injection time Tp and the ignition time Ts are advanced with the ignition interval Ds being kept constant. In consequence, the quantity of the unburned residue of the first injected fuel increases with increases in the engine load, as described above.

If the determination made in step S110 is negative, namely, if the load-adapted injection quantity S0 is larger than the second predetermined quantity S2, It is determined in step S120 whether or not the load-adapted injection quantity S0 is equal to or smaller than the third predetermined quantity S3, in other words, whether or not the engine load of the internal combustion engine 1 is in the second middle load range R5. As described above, the second predetermined quantity S2 is set as a fuel injection quantity adapted to the engine load at which the second injected fuel quantity Sm reaches its largest allowable value in view of the amount of smoke generated and the combustion stability. Therefore, the second middle load range R5 is set as an operation range in which only the first injected fuel quantity Sp is increased in response to increases in the engine load. The third predetermined quantity S3 is set as a fuel injection quantity adapted to the engine load at which not only the second injected fuel quantity Sm but also the first injected fuel quantity Sp reaches its largest allowable value in view of the amount of smoke generated when a quantity of fuel adequate for the load-adapted injection quantity S0 is injected only by the first injection and second injection without performing the third injection. In other words, the third predetermined quantity S3 is equal to the sum of the upper limit injected fuel quantity set for the first injection and the upper limit injected fuel quantity for the second injection with which the amount of smoke derived from the first/second injected fuel reaches the upper limit of an allowable range. If the determination made in step S120 is affirmative, the processing of step S121 is executed next. If the determination made in step S120 is negative, the processing of step S141 is executed next.

If the determination made in step S120 is affirmative, namely, if the load-adapted injection quantity S0 is larger than the second predetermined quantity S2 and equal to or smaller than the third predetermined quantity S3 (in other words, if the engine load of the internal combustion engine 1 is in the second middle load range R5), the second injected fuel quantity Sm is set to the maximum second injected fuel quantity Smmax according to the control map represented by line L22 in graph (a) in FIG. 13. The maximum second injected fuel quantity Smmax is the largest second injected fuel quantity with which the amount of smoke generated can be kept within an allowable range and stable combustion is ensured (namely, misfire due to the evaporation latent heat of the second injected fuel can be prevented from occurring). As shown by line L22 in graph (a) in FIG. 13, in the second middle load range R5, the second injected fuel quantity Sm is fixed at the maximum second injected fuel quantity Smmax.

Then, in step S122, the first injected fuel quantity Sp is determined using the control map represented by line L21 in graph (a) in FIG. 13. In the second middle load range R5, the relationship represented by line L21 between the engine load (the load-adapted injection quantity S0) and the first injected fuel quantity Sp is expressed by the following equation 3:

[Math.3]

$$Sp = (S0 - Sm)/\alpha \quad \text{(equation 3)},$$

where alpha is the unburned residue rate of the first injected fuel, as with in equation 2. According to the above equation 3, the first injected fuel quantity Sp can be determined taking into account characteristics of the basic combustion control according to this example. This is essentially the same as the processing of step S108 and the processing of step S114. In the second middle load range R5, the second injected fuel quantity Sm is fixed at the maximum second injected fuel quantity Smmax for the above-described reason, and hence Sm=Smmax in the above equation 3. Moreover, in the second middle load range R5, since the second injected fuel quantity Sm is fixed at the maximum second injected fuel quantity Smmax, the increase rate of the first injected fuel quantity Sp (i.e. the rate of the increase in the first injected fuel quantity Sp to the increase in the engine load) is higher than the increase rate of the first injected fuel quantity Sp in the first middle load range R4, in which the second injected fuel quantity Sm is also increased in response to increases in the engine load.

Then, in step S123, the first injection time Tp is determined using the control map represented by line L31 in graph (b) in FIG. 13. In the second middle load range R5, since the second injected fuel quantity Sm is fixed at the maximum second injected fuel quantity Smmax, the second injection time Tm determined in step S103 is also fixed. On the other hand, as described above, the increase rate of the first injected fuel quantity Sp in the second middle load range R5 is larger than the increase rate of the first injected fuel quantity Sp in the first middle load range R4. Therefore, in the second middle load range R5, it is necessary to make the first injection interval Di1 longer than the first injection interval Di1 in the first middle load range R4 in order to reduce overlapping of the unburned residue of the first injected fuel and the second injected fuel when the second injection is performed, and it is also necessary to make the increase rate of the first injection interval Di1 (which is the rate of the increase in the first injection interval Di1 to the increase in the engine load) higher than the increase rate of the first injection interval Di1 in the first middle load range R4. Therefore, in step S123, the first injection time Tp is advanced in such a way that the higher the engine load of the internal combustion engine 1 is, the longer the first injection interval Di1 is made. Then, the advancement rate of the first injection time Tp (which is the rate of the degree of advancement of the first injection time Tp to the increase in the engine load) is higher than the advancement rate of the first injection time Tp in the first middle load range R4. In this way, only the first injected fuel quantity Sp is increased in response to increases in the engine load by controlling the first injection time Tp, thereby reducing the overlapping of the unburned residue of the first injected fuel and the second injected fuel, even though the unburned residue of the first injected fuel increases. Consequently, the amount of smoke generated due to the overlapping of them can be reduced. Moreover, even though the unburned residue of the first injected fuel increases in accordance with the increase in the engine load, the thermal efficiency of the internal combustion engine 1 can be kept at high levels because the unburned residue is burned in the combustion after the start of the second injection to contribute to the engine power.

Then, in step S124, the ignition time Ts is determined using the control map represented by line L30 in graph (b) in FIG. 13. In the second middle load range R5 also, the ignition interval Ds, which is the interval between the first injection time Tp and the ignition time Ts, is kept constant, as shown in graph (b) in FIG. 13. Therefore, when the first injection time Tp is advanced in response to an increase in the engine load, the ignition time Ts is also advanced to a degree substantially the same as the first injection time Ts, as with in the first middle load range R4.

With the parameters relating to the first injection, the second injection, and the ignition determined in the above-described manner, an amount of unburned residue of the first injected fuel represented by M1 in graph (a) in FIG. 13 remains after the ignition of the pre-spray of the first injected fuel, in the second middle load range R5. As described above, in the second middle load range R5, as the engine load increases, the first injected fuel quantity Sp is increased, and the first injection time Tp and the ignition time Ts are advanced with the ignition interval Ds being kept constant. In consequence, as described above, as the engine load increases, the unburned residue of the first injected fuel increases. Moreover, in the second middle load range R5, the increase rate of the first injected fuel quantity Sp and the advancement rate of the first injection time Tp (or the increase rate of the first injection interval Di1) are higher than those in the first middle load range R4. Consequently, the increase rate of the unburned residue of the first injected fuel relative to the increase in the engine load is higher than that in the first middle load range R4. Therefore, it is possible to attain the engine power required by the increase in the engine load only by increasing the first injected fuel quantity Sp.

After the completion of the processing of one of steps S108, S114, and S124, the processing of step S130 is executed. In step S130, the first injection and the second injection by the fuel injection valve 6 and the ignition by the ignition plug 5 are performed according to the first injected fuel quantity Sp, the first injection time Ts, the second injected fuel quantity Sm, the second injection time Tm, and the ignition time Ts determined in the above-described process. Thus, the basic combustion control according to this example is carried out. After the completion of the processing of step S130, the processing of step S101 is executed again.

If the determination in step S120 is negative, namely if the load-adapted injection quantity S0 is larger than the third predetermined quantity S3, the engine load of the internal combustion engine 1 is in the high load range R6. As described above, the third predetermined quantity S3 is set as a fuel injection quantity adapted to the engine load at which not only the second injected fuel quantity Sm but also the first injected fuel quantity Sp reaches its upper limit value in view of the amount of smoke generated when a quantity of fuel adequate for the load-adapted injection quantity S0 is injected only by the first injection and second injection without performing the third injection. In other words, in the second middle load range R5, as the first injected fuel quantity Sp is increased and the first injection time Tp is advanced in response to increases in the engine load, the first injection interval Di1 or the interval between the first injection time Tp and the second injection time Tm reaches the aforementioned upper bound (Di1b in FIG. 7) at the time when the load-adapted injection quantity S0 reaches the third predetermined quantity S3. Therefore, the high load range R6 is set as an operation range in which the third injection is performed in addition to the first injection and the second injection, and the third injected fuel quantity Spp is increased in response to increases in the engine load.

If the determination made in step S120 is negative, in step S141, the second injected fuel quantity Sm is set to the maximum second injected fuel quantity Smmax according to the control map represented by line L22 in graph (a) in FIG. 13, in the same manner as in the case where the engine load is in the second middle load range R5. Thus, in the high load range R6, the second injected fuel quantity Sm is fixed at the maximum second injected fuel quantity Smmax as shown by line L22 in graph (a) in FIG. 13, as with in the second middle load range R5.

Then, in step S142, the first injected fuel quantity Sp is set to the minimum first injected fuel quantity Spmin according to the control map represented by line L21 in graph (a) in FIG. 13. As shown by line L21 in graph (a) in FIG. 13, in the high load range R6, the first injected fuel quantity Sp is fixed to the minimum first injected fuel quantity Spmin, as with in the low load range R3. This can reduce the overlapping of the unburned residue of the first injected fuel and the second injected fuel as much as possible. Consequently, the amount of smoke generated due to the overlapping of them can be reduced as much as possible.

Then, in step S143, the third injected fuel quantity Spp is determined using the control map represented by line L23 in graph (a) in FIG. 13. In the high load range R6, the relationship represented by line L23 between the engine load (or the load-adapted injection quantity S0) and the third injected fuel quantity Spp is expressed by the following equation 4:

[Math.4]

$$Spp = S0 - Sp \times \alpha - Sm \qquad \text{(Equation 4)},$$

where alpha is the unburned residue rate of the first injected fuel, as with in equation 2. As described above, in the high load combustion control according to this example, the most part of the third injected fuel self-ignites and is burned by diffusion combustion together with the second injected fuel to contribute to the engine load. Therefore, in terms of contribution to the engine power, the third injected fuel can be regarded to be equivalent to the second injected fuel. Therefore, a value of the third injected fuel quantity Spp adequate for attaining the fuel injection quantity adapted to the engine load can be determined by calculation according to the above equation 4. In the high load range R6, the second injected fuel quantity Sm is fixed to the maximum second injected fuel quantity Smmax, and hence Sm=Smmax in the above equation 4. Furthermore, in the high load range R6, the first injected fuel quantity Sp is fixed at the minimum first injected fuel quantity Spmin, and hence Sp=Spmin in the above equation 4. As will be described later, in the high load range R6, the first injection time Tp, the second injection time Tm, and the ignition time Ts are all constant, and the ignition interval Ds and the first injection interval Di1 are both constant accordingly. In consequence, the factor alpha in the above equation 4 is a constant value. Therefore, in the high load range R6, as the engine load increases, the third injected fuel quantity Spp is increased in accordance with the increase in the engine load.

In cases where it is necessary to inject a relatively large quantity of fuel by the third injection or where it is difficult to provide a sufficiently long second injection interval, the proportion of the third injected fuel that is burned by flame generated by ignition after the first injection may become large. If this proportion becomes significantly large, it is necessary in determining the third injected fuel quantity Spp to take into account the quantity of fuel burned by flame generated by ignition after the first injection. In such cases, the third injected fuel quantity Spp may be calculated according to the following equation 4':

[Math.5]

$$Spp = (S0 - Sp \times \alpha - Sm)/\beta \qquad \text{(Equation 4')},$$

where beta is the proportion of the fuel subject to self-ignition or diffusion combustion after the start of the second injection in the third injected fuel.

The factor beta in the above equation 4' can be determined in advance based on, for example, an experiment. An appropriate value of the third injected fuel quantity Spp can be determined by calculation according to the above equation 4', which takes into account the above-mentioned factor beta.

Then, in step S144, the first injection time Tp is determined using the control map represented by line L31 in graph (b) in FIG. 13. In the high load range R6, since the second injected fuel quantity Sm is fixed at the maximum second injected fuel quantity Smmax, the second injection time determined in step S103 is also kept constant. Moreover, in the high load range R6, the first injected fuel quantity Sp is also fixed at the minimum first injected fuel quantity Spmin. Consequently, in the high load range R6, the first injection time Tp, which is determined in relation to the second injection time Tm in such a way as to set an appropriate first injection interval Di1 with which a satisfactory thermal efficiency is attained when the first injected fuel quantity Sp is the minimum first injected fuel quantity Spmin, is also constant.

Then, in step S145, the ignition time Ts is determined using the control map represented by line L30 in graph (b) in FIG. 13. As shown in graph (b) in FIG. 13, the ignition interval Ds, which is the interval between the first injection time Tp and the ignition time Ts, is kept constant. Consequently, in the high load range R6, the ignition time Ts is also fixed.

Then, in step S146, the third injection time Tpp is determined using the control map represented by line L33 in graph (b) in FIG. 13. As described above, in the high load combustion control according to this example, it is necessary to provide an appropriate second injection interval Di2 as the interval between the first injection time Tp and the third injection time Tpp so that the third injected fuel is burned by self-ignition or diffusion combustion after the start of the second injection. Therefore, the third injection time Tpp is determined relative to the first injection time Tp in such a way that the second injection interval Di2 as such is provided. In the high load range R6, as described above, the third injected fuel quantity Spp is increased in response to increases in the engine load. Therefore, in the high load range R6, as shown in graph (b) in FIG. 13, as the engine load increases up to a certain engine load, the third injection time Tpp is advanced in such a way as to increase the second injection interval Di2. The larger the second injection interval Di2 is, the more extensively the third injected fuel is diffused in the combustion chamber by the time at which the first injection is performed. The more the third injection time Tpp is advanced, the lower the pressure in the combustion chamber at the third injection time Tpp is, and hence the higher the penetration of the spray of the third injected fuel is. For this reason also, the more the third injection time Tpp is advanced, the more extensively the third injection fuel is diffused in the combustion chamber. As the third injected fuel is diffused more extensively in the combustion chamber, the third injected fuel is apt to be burned by self-ignition or diffusion combustion after the start of the second injection rather than burned by flame generated by ignition of the pre-spray of the first injected fuel. However, if the third injection time is too early in the compression stroke, the third injected fuel is likely to adhere to the surface of the cylinder bore. Therefore, in order to keep the amount of adhesion of the third injected fuel to the bore surface within an allowable range, an upper limit (maximum advancement) is set for the third injection time Tpp. In the course of advancing the third injection time Tpp in response to increases in the engine load, if the third injection time Tpp reaches the upper limit, the third injection time Tpp is kept at the upper limit, even when the third injected fuel quantity Spp is increased in response to further increases in the engine load.

In the high load range R6, with the parameters relating to the first injection, the second injection, and the ignition determined in the above-described manner, an amount of unburned residue of the first injected fuel represented by M1 in graph (a) in FIG. 13 remains after the ignition of the pre-spray of the first injected fuel. In the high load range R6, the first injected fuel quantity Sp, the first injection interval Di1, and the ignition interval Ds are the same as those in the low load range R3. Consequently, the quantity of the unburned residue of the first injected fuel is substantially constant, as with in the low load range R3.

After the completion of the processing of step S146, the processing of step S147 is executed. In step S147, the first injection, the second injection, and the third injection by the fuel injection valve 6 and the ignition by the ignition plug 5 are performed according to the first injected fuel quantity Sp, the first injection time Ts, the second injected fuel quantity Sm, the second injection time Tm, the third injected fuel quantity Spp, the third injection time Tpp, and the ignition time Ts determined in the above-described process. Thus, the high load combustion control according to this example is carried out. After the completion of the processing of step S147, the processing of step S101 is executed again.

According to this example, as described above, stable diesel combustion can be caused to occur with reduced smoke and the thermal efficiency can be improved, by appropriately setting parameters relating to combustion control including the first injected fuel quantity Sp, the first injection time Tp, the second injected fuel quantity Sm, the second injection time Tm, the third injected fuel quantity Spp, the third injection time Tpp, and the ignition time Ts in relation to the engine load of the internal combustion engine 1. Moreover, in the high load range, a quantity of fuel equal to the load-adapted injection quantity S0 can be injected by performing the third injection while keeping the first injected fuel quantity Sp and the second injected fuel quantity Sm at their upper limit values. In other words, by performing the third injection in addition to the first injection and the second injection, the operation range in which diesel combustion can be caused to occur while keeping the amount of smoke in an allowable range can be more extended than in the case where only the first injection and the second injection are performed.

<Modification>

FIG. 14 shows another set of exemplary control maps used in the combustion control according to this example. In the upper graph (a) in FIG. 14, as with in graph (a) in FIG. 13, line L21 represents relationship between the engine load of the internal combustion engine 1 and the first injected fuel quantity, line L22 represents relationship between the engine load and the second injected fuel quantity, line L23 represents relationship between the engine load and the third injected fuel quantity, and line L20 represents relationship between the engine load and the load-adapted injection quantity, which is the fuel injection quantity adapted to the engine load. Moreover, the upper graph (a) in FIG. 14 also shows the amount of unburned residue M1 of the first injected fuel that has not been burned in combustion caused by ignition by the ignition plug 5. In the lower graph (b) in FIG. 14, as with in graph (b) in FIG. 13, line L31 represents relationship between the engine load of the internal combustion engine 1 and the first injection time Tp, line L30 represents relationship between the engine load and the ignition time Ts, line L32 represents relationship between the engine load and the second injection time Tm, and line L33 represents relationship between the engine load and the third injection time Tpp. The distance between line L31 and line L32 represents the first injection interval Di1, the distance between line L31 and line L30 represents the ignition interval Ds, and the distance between line L33 and line L31 represents the second injection interval Di2.

In the control maps according to this modification, the relationships between the engine load of the internal combustion engine 1 and the control parameters are the same as those in the control maps shown in FIG. 13 in the low load range R3, the first middle load range R4, and the second middle load range R5. In the control maps according to this modification also, as with in the control maps shown in FIG. 13, the second injected fuel quantity Sm is fixed at the maximum second injected fuel quantity Smmax and the second injection time Tm is fixed at a time adapted to the maximum second injected fuel quantity Smmax (i.e. the most advanced time of the second injection time Tm) in the high load range R6. The control maps according to this modification differ from the control maps shown in FIG. 13 in that the first injected fuel quantity Sp is fixed at the maximum first injected fuel quantity Spmax in the high load range R6 as shown by line L21 in graph (a) in FIG. 14. Furthermore, in the control maps according to this modification, as shown by line L31 in graph (b) in FIG. 14, the first injection time Tp is fixed at a time adapted to the maximum first injected fuel quantity Spmax (i.e. the most advanced time of the first injection time Tp) in the high load range R6. With the first injected fuel quantity Sp and the first injection time Tp determined as above, in the high load range R6, an amount of unburned residue of the first injected fuel represented by M1 in graph (a) in FIG. 14 remains after the ignition of the pre-spray of the first injected fuel. Thus, the amount of the unburned residue of the first injected fuel in the high load range R6 is substantially constant at the maximum amount.

In the control maps according to this modification also, as with in the control maps shown in FIG. 13, the third injection is also performed in addition to the first injection and the second injection in the high load range R6. In other words, the high load combustion control is performed in the high load range R6. As shown by line L23 in graph (a) in FIG. 14, the third injected fuel quantity Spp is increased as the engine load of the internal combustion engine 1 increases. As shown by line L33 in graph (b) in FIG. 14, the third injection time Tpp is advanced in such a way as to increase the second injection interval Di2 as the engine load of the internal combustion engine 1 increases. However, in the control maps according to this modification, the amount of the unburned residue of the first injected fuel in the high load range R6 is constant at the maximum amount. Therefore, the third injected fuel quantity Spp for the same engine load in the high load range R6 is smaller than that in the control maps shown in FIG. 13, in which the first injected fuel quantity Sp is fixed at the minimum first injected fuel quantity Spmin in the high load range R6 and the amount of the unburned residue of the first injected fuel is constant at the minimum amount. Consequently, in the high load range R6, the sum of the amount of the unburned residue of the first injected fuel and the third injected fuel quantity that are burned by self-ignition or diffusion combustion after the second injection is approximately equal to that in the case of the control maps shown in FIG. 13.

In the case where the first injected fuel quantity Sp, the first injection time Tp, the second injected fuel quantity Sm, the second injection time Tm, the third injected fuel quantity Spp, the third injection time Tpp, and the ignition time Ts in the high load range R6 are determined using the control maps according to this modification also, stable diesel combustion can be caused to occur with reduced smoke generation. Furthermore, with the control maps according to this modification, the changes of the first injected fuel quantity Sp and the first injection time Tp upon shift of the engine load of the internal combustion engine 1 from the second middle load range R5 to the high load range R6 or vice versa can be made relatively small. Therefore, it is considered that the robustness in controlling the first injected fuel quantity Sp and the first injection time Tp can be improved.

EXAMPLE 2

The general configuration of the internal combustion engine and its air-intake and exhaust systems according to example 2 is the same as that in example 1. In the following, a control flow of combustion control according to example 2 will be described with reference to FIGS. 15 to 17. FIGS. 15 and 16 are flow charts of the control flow of the combustion control according to this example. This control flow is stored in the ECU 20 in advance and carried out repeatedly at regular intervals by executing a control program stored in the ECU 20 while the internal combustion engine 1 is operating. Steps S101 to S108, S110 to S114, and S130 in this control flow are the same as those in the above-described flow shown in FIG. 11, and the steps in which the same processing is executed are denoted by the same reference numerals and will not be described further.

FIG. 17 shows exemplary control maps used in the combustion control according to this example. In the upper graph (a) in FIG. 17, as with in graph (a) in FIG. 13, line L21 represents relationship between the engine load of the internal combustion engine 1 and the first injected fuel quantity, line L22 represents relationship between the engine load and the second injected fuel quantity, line L23 represents relationship between the engine load and the third injected fuel quantity, and line L20 represents relationship between the engine load and the load-adapted injection quantity, which is the fuel injection quantity adapted to the engine load. Moreover, the upper graph (a) in FIG. 17 also shows the amount of unburned residue M1 of the first injected fuel that has not been burned in combustion caused by ignition by the ignition plug 5. In the lower graph (b) in FIG. 17, as with in graph (b) in FIG. 13, line L31 represents relationship between the engine load of the internal combustion engine 1 and the first injection time Tp, line L30 represents relationship between the engine load and the ignition time Ts, line L32 represents relationship between the engine load and the second injection time Tm, and line L33 represents relationship between the engine load and the third injection time Tpp. The distance between line L31 and line L32 represents the first injection interval Di1, the distance between line L31 and line L30 represents the ignition interval Ds, and the distance between line L33 and line L31 represents the second injection interval Di2.

As shown in FIG. 17, in this example, when the engine load of the internal combustion engine 1 is in the low load range R3 or the first middle load range R4, the above-described basic combustion control is performed. When the engine load of the internal combustion engine 1 is in the second middle load range R5 or the high load range R6, the above-described high load combustion control is performed. Thus, the combustion control according to this example differs from the combustion control according to example 1 in that the third injection is performed in addition to the first injection and the second injection not only in the high load range R6 but also in the second middle load range R5. In this example, the engine load on the border of the first middle load range R4 and the second middle load range R5 is the "predetermined load" as defined in the present invention.

In the control flow according to this example, if the determination in step S110 is negative, namely if the load-adapted injection quantity S0 is larger than the second predetermined quantity S2, the processing of steps S151 to S157 is executed. In step S151, the second injected fuel quantity Sm is set to the maximum second injected fuel quantity Smmax according to the control map represented by line L22 in graph (a) in FIG. 17. In other words, in the second middle load range R5 and the high load range R6, the second injected fuel quantity Sm is set to the maximum second injected fuel quantity Smmax.

Then, in step S152, the first injected fuel quantity Sp is determined using the control map represented by line L21 in graph (a) in FIG. 17. The first injected fuel quantity Sp is determined to be a predetermined first injected fuel quantity Spx smaller than the largest value of the first injected fuel quantity Sp in the first middle load range R4. Moreover, in the second middle load range R5 and the high load range R6, the first injected fuel quantity Sp is fixed at the predetermined first injected fuel quantity Spx, as shown by line L21 in graph (a) in FIG. 17. The largest value of the first injected fuel quantity Sp in the first middle load range R4 does not reach the maximum first injected fuel quantity Spmax. Nevertheless, even in such a situation also, in the second middle load range R5 and the high load range R6, the first injected fuel quantity Sp is fixed at the predetermined first injected fuel quantity Spx smaller than the largest value of the first injected fuel quantity Sp in the first middle load range R4. This can make the amount of unburned residue of the first injected fuel smaller than in the case where the first injected fuel quantity Sp is increased up to the maximum first injected fuel quantity Spmax in response to increases in the engine load. In consequence, the overlapping of the unburned residue of the first injected fuel and the second injected fuel can be reduced more effectively. Therefore, the amount of smoke generated due to the overlapping of them can be reduced further.

In the second middle load range R5 and the high load range R6, the first injected fuel quantity Sp may be fixed at the minimum first injected fuel quantity Spmin. This can reduce the overlapping of the unburned residue of the first injected fuel and the second injected fuel as much as possible. Therefore, the amount of smoke generated due to the overlapping of them can be reduced as much as possible.

Then, in step S153, the third injected fuel quantity Spp is determined using the control map represented by line L23 in graph (a) in FIG. 17. In the second middle load range R5 and the high load range R6, the relationship represented by line L23 between the engine load (the load-adapted injection quantity S0) and the third injected fuel quantity Spp is expressed by equation 4 presented above, as with in the high load range R6 in example 1. Therefore, the third injected fuel quantity Spp can be determined taking into account characteristics of the high load combustion control according to this example. In the second middle load range R5 and the high load range R6, the second injected fuel quantity Sm is fixed at the maximum second injected fuel quantity Smmax as described above, hence Sm=Smmax in the above equation 4. Furthermore, in the second middle load range R5 and the high load range R6, the first injected fuel quantity Sp is fixed at the predetermined first injected fuel quantity Spx, hence Sp=Spx in the above equation 4. As will be described later, in the second middle load range R5 and the high load range R6, the first injection time Tp, the second injection time Tm, and the ignition time Ts are all constant, and the ignition interval Ds and the first injection interval Di1 are both constant. In consequence, the factor alpha in the above equation 4 is a constant value. Therefore, in the second middle load range R5 and the high load range R6, as the engine load increases, the third injected fuel quantity Spp is increased in accordance with the increase in the engine load.

Then, in step S154, the first injection time Tp is determined using the control map represented by line L31 in graph (b) in FIG. 17. In the second middle load range R5 and the high load range R6, since the second injected fuel quantity Sm is fixed at the maximum second injected fuel quantity Smmax, the second injection time Tm determined in step S103 is also fixed. Moreover, in the second middle load range R5 and the high load range R6, the first injected fuel quantity Sp is also fixed at the predetermined first injected fuel quantity Spx. In consequence, in the second middle load range R5 and the high load range R6, the first injection time Tp, which is determined in relation to the second injection time Tm in such a way as to set an appropriate first injection interval Di1 with which a satisfactory thermal efficiency is attained when the first injected fuel quantity Sp is the predetermined first injected fuel quantity Spx, is also constant.

Then, in step S155, the ignition time Ts is determined using the control map represented by line L30 in graph (b) in FIG. 17. As shown in graph (b) in FIG. 17, the ignition interval Ds, which is the interval between the first injection time Tp and the ignition time Ts, is kept constant. Consequently, in the second middle load range R5 and the high load range R6, the ignition time Ts is also fixed.

Then, in step S156, the third injection time Tpp is determined using the control map represented by line L33 in graph (b) in FIG. 17. As with in the high load range R6 in example 1, the third injection time Tpp is determined in such a way as to provide an appropriate second injection interval Di that allows the third injected fuel to be burned by self-ignition or diffusion combustion after the start of the second injection. In the second middle load range R5 and the high load range R6, as with in the high load range R6 in example 1, the third injected fuel quantity Spp is increased as the engine load increases. Therefore, in the second middle load range R5 and the high load range R6, as shown in graph (b) in FIG. 17, the third injection time Tpp is advanced in such a way as to increase the second injection interval Di2 with increases in the engine load up to a certain engine load (namely, until the third injection time Tpp reaches an upper limit or the maximum advancement).

In the second middle load range R5 and the high load range R6, with the parameters relating to the first injection, the second injection, and the ignition determined in the above-described manner, an amount of unburned residue of the first injected fuel represented by M1 in graph (a) in FIG. 17 remains after the ignition of the pre-spray of the first injected fuel. In the second middle load range R5 and the high load range R6, the first injected fuel quantity Sp, the first injection interval Di1, and the ignition interval Ds are constant. Consequently, the quantity of the unburned residue of the first injected fuel is substantially constant, in the second middle load range R5 and the high load range R6.

After the completion of the processing of step S156, the processing of step S157 is executed. In step S157, the first injection, the second injection, and the third injection by the fuel injection valve 6 and the ignition by the ignition plug 5 are performed according to the first injected fuel quantity Sp, the first injection time Ts, the second injected fuel quantity Sm, the second injection time Tm, the third injected fuel quantity Spp, the third injection time Tpp, and the ignition time Ts determined in the above-described process. Thus, the high load combustion control according to this example is carried out. After the completion of the processing of step S157, the processing of step S101 is executed again.

In the control according to this example, by performing the third injection not only in the high load range R6 but also in the second middle load range R5, the first injected fuel quantity Sp can be made relatively small, when the engine load of the internal combustion engine 1 is in the second middle load range R5. Therefore, the amount of smoke generated due to overlapping of the unburned residue of the first injected fuel and the second injected fuel in the second middle load range can be further reduced.

In this example, in the second middle load range R5 and the high load range R6, the first injected fuel quantity Sp may be fixed at the largest value of the first injected fuel quantity Sp in the first middle load range R4. In this case, the first injection time Tp is also fixed at the maximum advancement of the first injection time Tp in the first middle load range R4. Thus, the changes of the first injected fuel quantity Sp and the first injection time Tp upon shift of the engine load of the internal combustion engine 1 from the first middle load range R4 to the second middle load range R5 or vice versa can be made small. Therefore, it is considered that the robustness in controlling the first injected fuel quantity Sp and the first injection time Tp can be improved.

<Modification>

FIG. 18 shows another set of exemplary control maps used in the combustion control according to this example. In the upper graph (a) in FIG. 18, as with in graph (a) in FIG. 13, line L21 represents relationship between the engine load of the internal combustion engine 1 and the first injected fuel quantity, line L22 represents relationship between the engine load and the second injected fuel quantity, line L23 represents relationship between the engine load and the third injected fuel quantity, and line L20 represents relationship between the engine load and the load-adapted injection quantity, which is the fuel injection quantity adapted to the engine load. Moreover, the upper graph (a) in FIG. 18 also shows the amount of unburned residue M1 of the first injected fuel that has not been burned in combustion caused by ignition by the ignition plug 5. In the lower graph (b) in FIG. 18, as with in graph (b) in FIG. 13, line L31 represents relationship between the engine load of the internal combustion engine 1 and the first injection time Tp, line L30 represents relationship between the engine load and the ignition time Ts, line L32 represents relationship between the engine load and the second injection time Tm, and line L33 represents relationship between the engine load and the third injection time Tpp. The distance between line L31 and line L32 represents the first injection interval Di1, the distance between line L31 and line L30 represents the ignition interval Ds, and the distance between line L33 and line L31 represents the second injection interval Di2.

In the control maps according to this modification, the relationships between the engine load of the internal combustion engine 1 and the control parameters are the same as those in the control maps shown in FIG. 17 in the low load range R3 and the first middle load range R4. In the control maps according to this modification also, as with in the control maps shown in FIG. 17, the second injected fuel quantity Sm is fixed at the maximum second injected fuel quantity Smmax and the second injection time Tm is fixed at a time adapted to the maximum second injected fuel quantity Smmax (i.e. the most advanced time of the second injection time Tm) in the second middle range R5 and the high load range R6. The control maps according to this modification differ from the control maps shown in FIG. 17 in that the first injected fuel quantity Sp is increased in response to increases in the engine load also in the second middle load range R5 and the high load range R6 as shown by line L21 in graph (a) in FIG. 18. Furthermore, in the control maps according to this modification, as shown by line L31 in graph (b) in FIG. 18, the first injection time Tp is advanced in response to increases in the engine load in the second middle load range R5 and the high load range R6. With the first injected fuel quantity Sp and the first injection time Tp determined as above, in the second middle load range R5 and the high load range R6, an amount of unburned residue of the first injected fuel represented by M1 in graph (a) in FIG. 18 remains after the ignition of the pre-spray of the first injected fuel. Thus, in the second middle load range R5 and the high load range R6, as the engine load increases, the amount of the unburned residue of the first injected fuel increases.

In the control maps according to this modification also, the third injection is performed in addition to the first injection and the second injection, not only in the high load range R6 but also in the second middle load range R5. As shown by line L23 in graph (a) in FIG. 18, the third injected fuel quantity Spp is increased as the engine load of the internal combustion engine 1 increases. Moreover, as shown by line L33 in graph (b) in FIG. 18, the third injection time Tpp is advanced in such a way as to increase the second injection interval Di2 as the engine load of the internal combustion engine 1 increases. However, in the control maps according to this modification, the amount of the unburned residue of the first injected fuel in the second middle load range R5 and the high load range R6 increases as the engine load increases. Therefore, the third injected fuel quantity Spp for the same engine load in the second middle load range R5 and the high load range R6 is smaller than that in the control maps shown in FIG. 17, in which the first injected fuel quantity Sp is fixed at the predetermined first injected fuel quantity Spx in the second middle load range R5 and the high load range R6 and the amount of the unburned residue of the first injected fuel is constant. Consequently, in the high load range R6, the sum of the amount of the unburned residue of the first injected fuel and the third injected fuel quantity that are burned by self-ignition or diffusion combustion after the second injection is approximately equal to that in the case of the control maps shown in FIG. 13.

Even in the case where the first injected fuel quantity Sp is increased in response to increases in the engine load in the second middle load range R5 and the high load range R6 as with the control maps of this modification, the first injected fuel quantity Sp is kept equal to or smaller than the maximum first injected fuel quantity Spmax by adjusting the third injected fuel quantity Spp to an appropriate value. Therefore, it is possible to keep the amount of smoke generated due to the overlapping of the unburned residue of the first injected fuel and the second injected fuel within an allowable range. In other words, it is possible to increase the first injected fuel quantity Sp in response to increases in the engine load while keeping the amount of smoke generated due to the overlapping of the unburned residue of the first injected fuel and the second injected fuel within an allowable range.

In the case where the first injected fuel quantity Sp, the first injection time Tp, the second injected fuel quantity Sm, the second injection time Tm, the third injected fuel quantity Spp, the third injection time Tpp, and the ignition time Ts in the second middle load range and the high load range R6 are determined using the control maps according to this modification also, stable diesel combustion can be caused to occur with reduced smoke generation.

In the high load combustion control according to this example, in the second middle load range R5 and the high load range R6, appropriately adjusting the third injected fuel quantity Spp allows the second injected fuel quantity Sm to be increased in the range not exceeding the maximum second injected fuel range Smmax in response to increases in the engine load. In other words, the second injected fuel quantity Sm may be increased in response to increases in the engine load while keeping the amount of smoke derived from the second injected fuel within an allowable range.

Even in the case where not only the third injected fuel quantity Spp but also at least one of the first injected fuel quantity Sp and the second injected fuel quantity Sm is increased in response to increases in the engine load in the second middle load range R5 and the high load range R6, it is preferred that 50 percent or more of the increase in the load-adapted injection quantity S0 responsive to an increase in the engine load be made up of the increase in the third injected fuel quantity Spp. In other words, it is preferred that the increase in the first injected fuel quantity Sp and the second injected fuel quantity Sm be smaller than the increase in the third injected fuel quantity Spp. If this is the case, in the case where at least one of the first injected fuel quantity Sp and the second injected fuel quantity Sm is increased in response to an increase in the engine load, the amount of smoke can be made smaller than that in the case where 50 percent or more of the increase in the load-adapted injection quantity S0 responsive to the increase in the engine load is made up of the increase in the first injected fuel quantity Sp and the increase in the second injected fuel quantity Sm (or the increase in one of the first injected fuel quantity Sp and the second injected fuel quantity Sm, in the case where only one of them is increased).

REFERENCE SIGNS LIST

1: internal combustion engine
2: cylinder
3: piston
5: ignition plug
6: fuel injection valve
7: intake port
8: exhaust port
9: intake valve
10: exhaust valve
20: ECU
21: crank position sensor
22: accelerator position sensor
71: throttle valve
72: air flow meter
Tp: first injection time
Tm: second injection time
Tpp: third injection time
Ts: ignition time
Di1: first injection interval
Di2: second injection interval
Ds: ignition interval
Sp: first injected fuel quantity
Sm: second injected fuel quantity
Spp: third injected fuel quantity

The invention claimed is:
1. A control apparatus for an internal combustion engine comprising:
a fuel injection valve capable of injecting gasoline as fuel into a combustion chamber of said internal combustion engine;
an ignition plug whose position relative to the fuel injection valve is set in such a way that fuel spray injected through said fuel injection valve passes through an ignition-capable region and the ignition can ignite the fuel spray directly; and
a controller comprising at least one processor configured to
perform first injection through said fuel injection valve at a first injection time during the compression stroke, spark-ignite pre-spray formed by the first injection by said ignition plug, and
start to perform second injection through said fuel injection valve at a second injection time which is a time after the ignition of said pre-spray by said ignition plug and before the top dead center of the compression stroke with a predetermined first injection interval between said first injection time and said second injection time, said first injection interval being set in such a way that combustion of the fuel injected by said second injection is started by flame generated by ignition of said pre-spray, thereby causing self-ignition of fuel to occur and causing a portion of fuel injected by said second injection to be burned by diffusion combustion, wherein when the quantity of pre-spray fuel is increased, said controller advances said first injection time responsive to the increase in the quantity of said pre-injected fuel, thereby increasing an injection interval between said first injection time and said predetermined injection start time of said second injection,
perform wherein in an operation range in which the engine load of the internal
preform third injection in addition to said first injection and second injection at a third injection time prior to said first injection time during the compression stroke with a predetermined second injection interval between said first injection and said third injection, said second injection interval being set in such a way that the fuel injected by said third injection is burned by self-ignition or diffusion combustion after the start of said second injection in an operation range in which the engine load of the internal combustion engine is higher than a predetermined load, and
increase the injected fuel quantity in said third injection and increases said predetermined second injection interval by advancing said third injection time, in response to an increase in the engine load in the operation range in which the engine load of the internal combustion engine is higher than said predetermined load.

2. A control apparatus for an internal combustion engine according to claim 1, wherein said controller increases the injected fuel quantity in said third injection in response to an increase in the engine load, fifty percent or more of an increase in the total injected fuel quantity responsive to the increase in the engine load is made up of an increase in the injected fuel quantity in said third injection, and the remaining portion of said increase in the total injected fuel quantity is made up of an increase in the injected fuel quantity in at least one of said first injection and second injection.

3. A control apparatus for an internal combustion engine according to claim 1, wherein in the operation range in which the engine load of the internal combustion engine is higher than said predetermined load, said controller keeps the injected fuel quantity in said second injection at a fixed quantity regardless of the engine load.

4. A control apparatus for an internal combustion engine according to claim 1, wherein in the operation range in which the engine load of the internal combustion engine is higher than said predetermined load, said controller keeps the injected fuel quantity in said first injection at a fixed quantity regardless of the engine load.

5. A control apparatus for an internal combustion engine according to claim 4, wherein in an operation range in which the engine load of the internal combustion engine is equal to or lower than said predetermined load, said controller increases the injected fuel quantity in said first injection and advances said first injection time in response to an increase in the engine load, and in the operation range in which the engine load of the internal combustion engine is higher than said predetermined load, said controller keeps the injected fuel quantity in said first injection at a fixed quantity smaller than a largest injected fuel quantity in said first injection in the operation range in which the engine load is equal to or lower than said predetermined load and keeps said first injection time at a fixed time later than a most advanced first injection time in the operation range in which the engine load is equal to or lower than said predetermined load.

* * * * *